United States Patent
Sun et al.

(10) Patent No.: US 12,094,013 B2
(45) Date of Patent: Sep. 17, 2024

(54) OPERATION METHOD AND SYSTEM FOR DISTRIBUTED GENERATION

(71) Applicant: SUN ELECTRIC DIGITAL STREAM INC., Dover, DE (US)

(72) Inventors: Sun Sun, Waterloo (CA); Srinivasan Keshav, Waterloo (CA); Matthew Peloso, Singapore (SG); Catherine Rosenberg, Waterloo (CA)

(73) Assignee: SUN ELECTRIC DIGITAL STREAM INC., Dover, DE (US)

( * ) Notice: Subject to any disclaimer, the term of this patent is extended or adjusted under 35 U.S.C. 154(b) by 83 days.

(21) Appl. No.: 16/981,635

(22) PCT Filed: Mar. 15, 2019

(86) PCT No.: PCT/SG2019/050147
§ 371 (c)(1),
(2) Date: Sep. 16, 2020

(87) PCT Pub. No.: WO2019/177545
PCT Pub. Date: Sep. 19, 2019

(65) Prior Publication Data
US 2021/0057914 A1    Feb. 25, 2021

(30) Foreign Application Priority Data
Mar. 16, 2018    (SG) .......................... 10201802208Q

(51) Int. Cl.
*H02J 3/38*    (2006.01)
*G05B 19/042*    (2006.01)
(Continued)

(52) U.S. Cl.
CPC .......... *G06Q 50/06* (2013.01); *G05B 19/042* (2013.01); *H02J 3/004* (2020.01); *H02J 3/381* (2013.01);
(Continued)

(58) Field of Classification Search
CPC .................. G06Q 50/06; G05B 19/042; G05B 2219/37283; H02J 3/004; H02J 3/381;
(Continued)

(56) References Cited

U.S. PATENT DOCUMENTS 9,286,646 B1    3/2016    Hoff
2014/0046467 A1    2/2014    Slocum et al.
(Continued)

FOREIGN PATENT DOCUMENTS

EP    2312506 A1    4/2011
KR    101570302 B1    11/2015
(Continued)

OTHER PUBLICATIONS

"International Application No. PCT/SG2019/050147, International Search Report and Written Opinion mailed Jul. 23, 2019", (Jul. 23, 2019), 11 pgs.
(Continued)

*Primary Examiner* — Charles R Kasenge
(74) *Attorney, Agent, or Firm* — Womble Bond Dickinson (US) LLP

(57) ABSTRACT

Operation methods and systems for distributed generation from a plurality of generators, and computer readable media. One method comprises the step of applying a forward looking matching algorithm to determine a matching matrix with elements $m_{i,j}$ denoting the fraction of generator i's predicted supply assigned to respective load j of a plurality of loads such that a probability of meeting each load's associated power demand characteristic in a next supply cycle satisfies a threshold criterion.

7 Claims, 11 Drawing Sheets

(51) Int. Cl.
*G06Q 50/06* (2012.01)
*H02J 3/00* (2006.01)

(52) U.S. Cl.
CPC . *G05B 2219/37283* (2013.01); *H02J 2203/20* (2020.01); *H02J 2300/24* (2020.01)

(58) Field of Classification Search
CPC ... H02J 2203/20; H02J 2300/24; Y02E 10/56; Y02E 60/00; Y04S 40/20
See application file for complete search history.

(56) References Cited

U.S. PATENT DOCUMENTS

| | | | |
|---|---|---|---|
| 2016/0033986 A1* | 2/2016 | Kamel | G05F 1/66 700/295 |
| 2016/0091904 A1 | 3/2016 | Horesh et al. | |
| 2016/0305678 A1* | 10/2016 | Pavlovski | F24F 11/30 |

FOREIGN PATENT DOCUMENTS

| WO | WO-2017217933 | 12/2017 |
|---|---|---|
| WO | WO-2019177545 A1 | 9/2019 |

OTHER PUBLICATIONS

Ben-Tal, Aharon, et al., "Robust solutions of uncertain linear programs", Operations Research Letters 25, (1999), 1-13.

Calafiore, G. C., et al., "On Distributionally Robust Chance-Constrained Linear Programs", Journal of Optimization Theory and Applications: vol. 130, No. 1, (Jul. 2006), 1-22.

Calafiore, Giuseppe C., et al., "The scenario approach to robust control design", IEEE Trans. Automat. Control, vol. 51, Issue 5, (2006), 742-753.

Delage, Erick, et al., "Distributionally Robust Optimization under Moment Uncertainty with Application to Data-Driven Problems", Operations Research, vol. 58, issue 3, (2010), 595-612.

Luedtke, James, et al., "A Sample Approximation Approach for Optimization with Probabilistic Constraints", SIAM Journal on Optimization, vol. 19, Issue 2, (2008), 674-699.

Widen, Joakim, et al., "Variability assessment and forecasting of renewables: A review for solar, wind, wave and tidal resources", Renewable and Sustainable Energy Reviews, vol. 44, (Apr. 2015), 356-375.

\* cited by examiner applying a forward looking matching algorithm to determine a matching matrix with elements $m_{i,j}$ denoting the fraction of generator $i$'s predicted supply assigned to respective load $j$ of a plurality of loads such that a probability of meeting each load's associated power demand characteristic in a next supply cycle satisfies a threshold criterion

1100

FIGURE 11 applying a forward looking matching algorithm such that a probability of meeting an associated power demand characteristic of each one of a plurality of loads satisfies a threshold criterion

1202 sequentially admitting one or more additional loads having respective associated power demand characteristics if a surplus of the distributed energy generation is determined while satisfying the threshold criterion

1204

1200

FIGURE 12

OPERATION METHOD AND SYSTEM FOR DISTRIBUTED GENERATION

PRIORITY CLAIM TO RELATED APPLICATIONS

This application is a U.S. national stage filing under 35 U.S.C. § 371 from International Application No. PCT/SG2019/050147, filed on 15 Mar. 2019, and published as WO2019/177545 on 19 Sep. 2019, which claims the benefit under 35 U.S.C. 119 to Singapore Application No. 10201802208Q, filed on 16 Mar. 2018, the benefit of priority of each of which is claimed herein, and which applications and publication are hereby incorporated herein by reference in their entirety.

FIELD OF INVENTION

The present invention relates broadly to an operation method and system for distributed generation.

BACKGROUND

Distributed generation provides an increasing power supply capacity integrated into a power distribution network. As new distributed generators are connected to the power grid, consumers are provided with additional power resources to obtain electrical power from. Distributed generators are characteristically intermittent, and as such consistent power generation from these devices requires the additional cost of storage to be incorporated with distributed generation capacities (for example chemical storage), or the supply of power to be developed based on an inherently stochastic output from the distributed generator.

In such a scenario, it is difficult to provide customers with certainty around the generation output of a distributed generator into the power grid system and thus the availability of electrical power on the power grid system to power consumers connected on a power grid. This is because the turn on time of a generator, degradation of a distributed generator, various user supplies that may already be provided from the distributed generator, and the stochastic output of the distributed generator lead to uncertainty in the supply of power which can be derived from the distributed generator. Moreover, consumers of electrical power want to obtain specific amounts of power that can be provided to them at future times and ensure adequate electrical power generation for their needs, which themselves are not certain and can be stochastic in nature. In addition, more consumers desire to cover their energy consumption from green sources, which are prevailing in distributed generators, and seek insurances from their providers in that regard.

To date, no system can adequately predict power output criteria such that products would obtain a certain amount of electrical power derived from distributed generation systems accounting for the variation in user power consumption, product switching among power consumers, the time of turn on of various distributed generators being connected to an electrical power network, or the stochastic nature of consumption of power by humans, and generation from distributed generation.

Embodiments of the present invention seek to address at least one of the above problems.

SUMMARY

In accordance with a first aspect of the present invention there is provided an operation method for distributed energy generation from a plurality of generators, the method comprising the step of applying a forward looking matching algorithm to determine a matching matrix with elements $m_{i,j}$ denoting the fraction of generator i's predicted supply assigned to respective load j of a plurality of loads such that a probability of meeting each load's associated power demand characteristic in a next supply cycle satisfies a threshold criterion.

In accordance with a second aspect of the present invention there is provided an operation method for distributed energy generation from a plurality of generators, the method comprising the steps of applying a forward looking matching algorithm such that a probability of meeting an associated power demand characteristic of each one of a plurality of loads satisfies a threshold criterion; and sequentially admitting one or more additional loads having respective associated power demand characteristics if a surplus of the distributed energy generation is determined while satisfying the threshold criterion.

In accordance with a third aspect of the present invention there is provided an operation system for distributed energy generation from a plurality of generators, the system comprising a processing unit configured for applying a forward looking matching algorithm to determine a matching matrix with elements $m_{i,j}$ denoting the fraction of generator i's predicted supply assigned to respective load j of a plurality of loads such that a probability of meeting each load's associated power demand characteristic in a next supply cycle satisfies a threshold criterion.

In accordance with a fourth aspect of the present invention there is provided an operation system for distributed energy generation from a plurality of generators, the system comprising a processing unit configured for applying a forward looking matching algorithm such that a probability of meeting an associated power demand characteristic of each one of a plurality of loads satisfies a threshold criterion; and for sequentially admitting one or more additional loads having respective associated power demand characteristics if a surplus of the distributed energy generation is determined while satisfying the threshold criterion.

In accordance with a fifth aspect of the present invention there is provided a computer readable medium having embodied therein data and/or instructions for instructing a computing device to implement the system of the third or fourth aspects and/or the method of the first or second aspects.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 11 illustrates the method step of an operation method for distributed generation from a plurality of generators, according to an example embodiment.

FIG. 12 shows a flow chart illustrating an operation method for distributed generation from a plurality of generators, according to an example embodiment.

DETAILED DESCRIPTION

Figure 1:
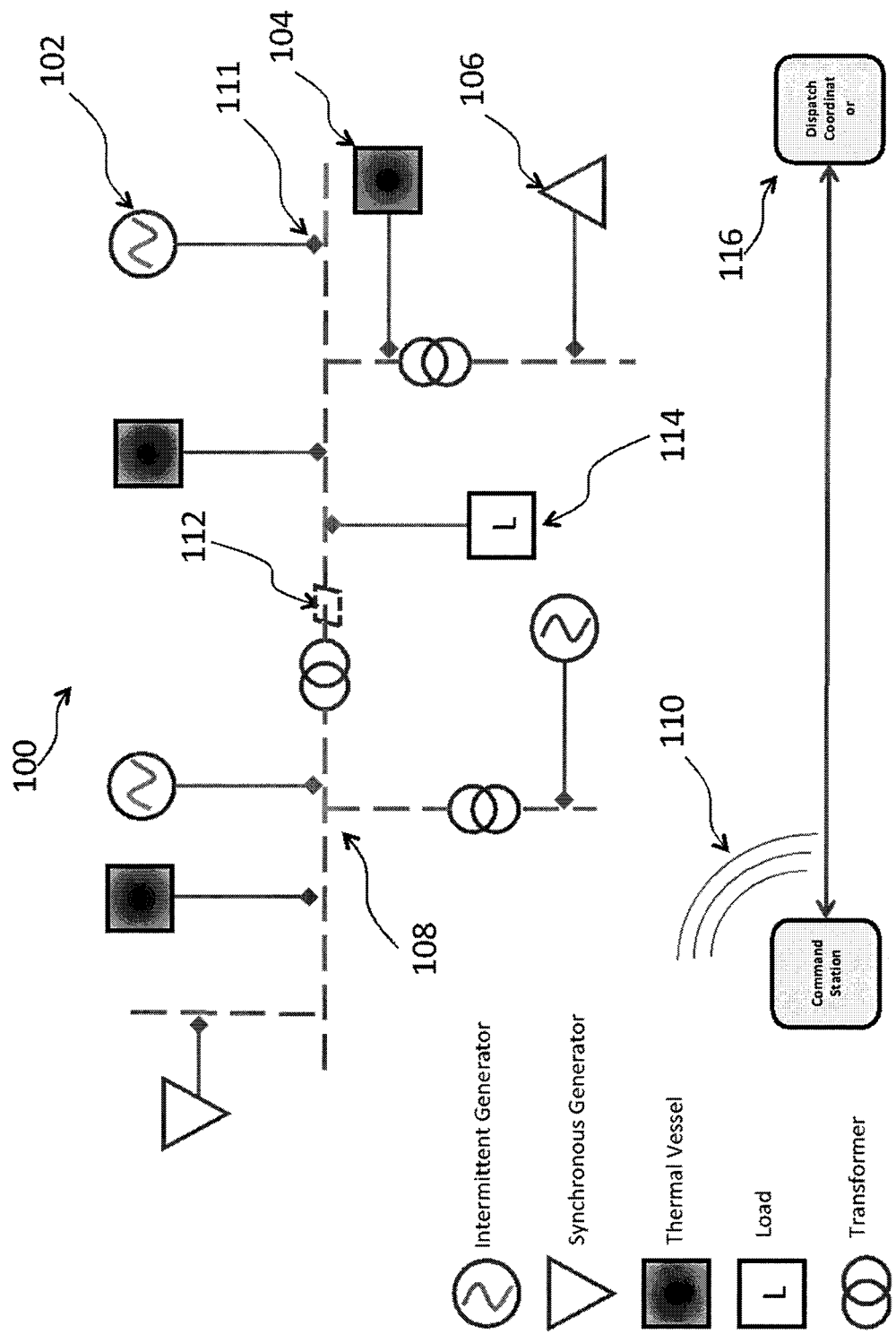
FIG. 1 shows a schematic drawing illustrating a mains power grid as an implementation scenario according to an example embodiment.

Example embodiment of the present invention can provide a method and system that can meet the demand for sustainable power being available to consumers. In one implementation scenario, locally-produced sustainable power from community micro-grids distribute power generated by roof-mounted solar PV systems to electricity users or consumers connected to the electrical power network. It is noted that distributed generator(s) using other renewable resources such as hydro or wind may also be connected to the electrical power grid network in different application scenarios of the embodiments of the present invention, and that the present invention is not limited to PV systems. In the following description solar power generation and the specific optimisation algorithms and techniques for application to the solar generation devices, are being considered and described by way of example, not limitation, i.e. the methods and systems can be implemented for other forms of distributed generation in different embodiments.

With the rapid decline in the price of solar photovoltaic systems, it has become increasingly cost-effective for both residential and commercial building owners to generate electricity from roof-mounted systems. They can either use this energy themselves or sell it to e.g. geographically-close 'green' consumers who wish to purchase renewable energy for many reasons including: reducing their carbon footprint; reducing their electricity cost, if the sale price is lower than the cost of grid electricity; reducing their price volatility due to exposure to fossil-powered grid electricity; and, in some jurisdictions, obtaining tax or 'green' building credits [6, 14].

Embodiments of the present invention described herein can provide a solution of the problem of matching one or more inherently intermittent solar energy producers with power consumer(s) so that, with a high probability, a certain component of their load is met from the solar generation (i.e. the distributed generators). This optimal matching has been recognized and formulated as a stochastic optimization problem by the inventors, which incorporates the uncertainty of both distributed solar generation and consumer loads which are governed by their behaviour. To solve the problem, four example algorithms which make different assumptions on the distributions of solar generation and loads are described according to various embodiments. The performance of these algorithms is compared using real data, and it was found that, for the considered dataset, an embodiment that uses Gaussian mixture models for solar and loads best fits the design requirements in a preferred embodiment, while higher order Marcov models provides additional applications using the systems of matching development through stochastic optimisation of selected distributions. A set of admission control algorithms to admit customers or power users is also provided according to example embodiments, based on the matching algorithms so that the allocation of electric power generation from the distributed generators can be feasible.

The system formulation develops optimised power supply incorporating a virtual power plant (VPP) operator which organises both purchasers and suppliers of green electricity, executing supply-side contracts with the producers (distributed solar generators) such as those in community micro-grids, and demand-side contracts with consumers to match their electricity demand, thus supplying them with the 'green' energy. The VPP operator can act as a market-maker and establish contracts for the next billing period as peer-to-peer power supply contracts developed to optimise the physical power flows on a power grid network, i.e., between electrical generators and electricity consumers connected through the power grid network. It can be assumed that the contiguous power grid network acts as a conductor providing electrical potential fields at or near the speed of light. Embodiments of the present invention can provide a method and system for matching generators to consumers and controlling the admission of generators and consumers into the system, so that, with a high probability, the supply contracts will be met.

According to example embodiments, given historical data of solar generation and energy consumption of consumers, a certain component of generation from each producer is matched with each consumer load so that, with a high probability, their anticipated load through the billing cycle is established in whole or in part from the set of selected producers. Criteria to provide users blends of solar production to their loads is various, and priority access to the solar production can be set up with varying priorities cascaded through the electrical loads priority access and actual consumption from producers. WO 2017/217933 describes various examples of blends of solar production and varying priorities cascaded through electrical loads, the content of which are hereby incorporated by cross-reference. The matching of production to consumption of electrical power can be performed in various time intervals and audited over various time intervals. In this document, for simplicity, it is assumed that two priority classifications of priority access and non-priority access (each with possible sub-classifications, e.g. different blends/ranges of blends of solar production) are implemented with a cycle of one month being the billing period through which users are provided with electrical power in a single audit cycle. A person skilled in the art would understand that multiple kinds of priority or consumer products can be developed using the invention. Moreover, a billing cycle is typically one month and can be set to a number of different periods. However, the present invention is not limited to consideration of billing cycles as such, but may instead additionally or alternatively be implemented over any desired period, including over each time interval implemented on a power grid as a minimum time slot in the power trading on that power grid. Also, the present invention is not limited to use of historical data, but may instead additionally or alternatively use simulated data or sampled historical data. An algorithm for the matching can be developed independent of actual measured generation or consumption information in some embodiments, and/or measured data can be used to refine the matching algorithm.

In example embodiments based on billing cycle, the matching problem is solved at the start of each billing cycle, which is when load and solar profiles can be updated with recent measurement data, and new consumers or new generators can be admitted to the system (if possible). Embodiments of the present invention can advantageously address the challenge that the actual future values of both solar generation and energy consumption are highly variable and unknown at the beginning of each billing cycle.

In the following description of example embodiments of the present invention, first, several approaches to allocating a fixed portion of energy generated by each solar producer to each consumer for the next billing cycle, e.g., a month according to example embodiments are described and compared. Second, example embodiments implementing admission control algorithms are described that determine whether a consumer can be admitted to the system, i.e., their anticipated load can be met from the existing set of producers. The example embodiments use a probabilistic stochastic optimization approach to model intermittency in solar power generation and load variability.

FIG. 1 shows a schematic drawing illustrating a mains power grid 100, which may represent a community microgrid, showing incorporation of intermittent (herein after also referred to as non-dispatchable) generation resources e.g. 102, consumer loads e.g. 114 and optional conventional generation turbines e.g. 106 with various points of coupling to the transmission and distribution network 108. Optional thermal storage elements e.g. 104 are also shown in FIG. 1, which may be used to optimize supply from the non-dispatchable generation sources e.g. 102 in some embodiments. In the following, method and systems for use with non-dispatchable generation resources e.g. 102 according to example embodiments will be described.

For the effective control of non-dispatchable generation resources e.g. 102 such as photovoltaic generating units, one or more central server and communication units 110 (also referred to as a server command station herein) are installed in example embodiments to effect or instruct control to each individual non-dispatchable generation resources e.g. 102, while a programmable logic controller (PLC) is equipped locally at each non-dispatchable generation resources e.g. 102.

Preferably, the entire specification list and historic generation data of each non-dispatchable generation resource e.g. 102 are available at the server command station 110. Similarly, the entire specification list of and historical consumption of each load e.g. 114 are available at the server command station 110. Utilizing that information, the server command station 110 can implement the method and systems according to example embodiments of the present invention.

Information representing the nodal supply and demand factors as associated with various locations on the transmission and distribution network 108 of the electrical mains power grid 100 can also be accessible to the server command station 110. Electrical tension is defined herein by way of associating each non-dispatchable generation resource e.g. 102 to the local point of common coupling to the transmission and distribution network 108 of the mains power grid 100 and the equivalent electrical distance to a target node or point of target supply and demand, e.g. 112 to a load or loads e.g. 114, within the electrical mains power grid 100.

Thermal storage units e.g. 104, which may conventionally be considered merely as part of the consumption load on the mains power grid, can represent a potential resource from which frequency response stability can be implemented in some embodiments, and which are e.g. cheaper than chemical storage units.

The command station 110 implements the methods and systems for allocating a fixed portion of energy generated by each solar producer e.g. 102 to each consumer e.g. 114, for example for the next billing cycle, such as a month, according to example embodiments and for admission control that determine whether a consumer can be admitted to the system, i.e., their anticipated load can be met from the existing set of producers. As mentioned above, the example embodiments use a probabilistic stochastic optimization approach to model intermittency in solar power generation and load variability.

Through provision of the above described allocation/matching and admission control procedures adopted over an aggregation of non-dispatchable generation resources e.g. 102 and an aggregation of consumer loads e.g. 114, a method and system for matching generators e.g. 102 to consumer loads e.g. 114 and for controlling the admission of generators and consumers into the system, so that, with a high probability, the supply contracts will be met, are advantageously provided according to example embodiments.

Figure 2:
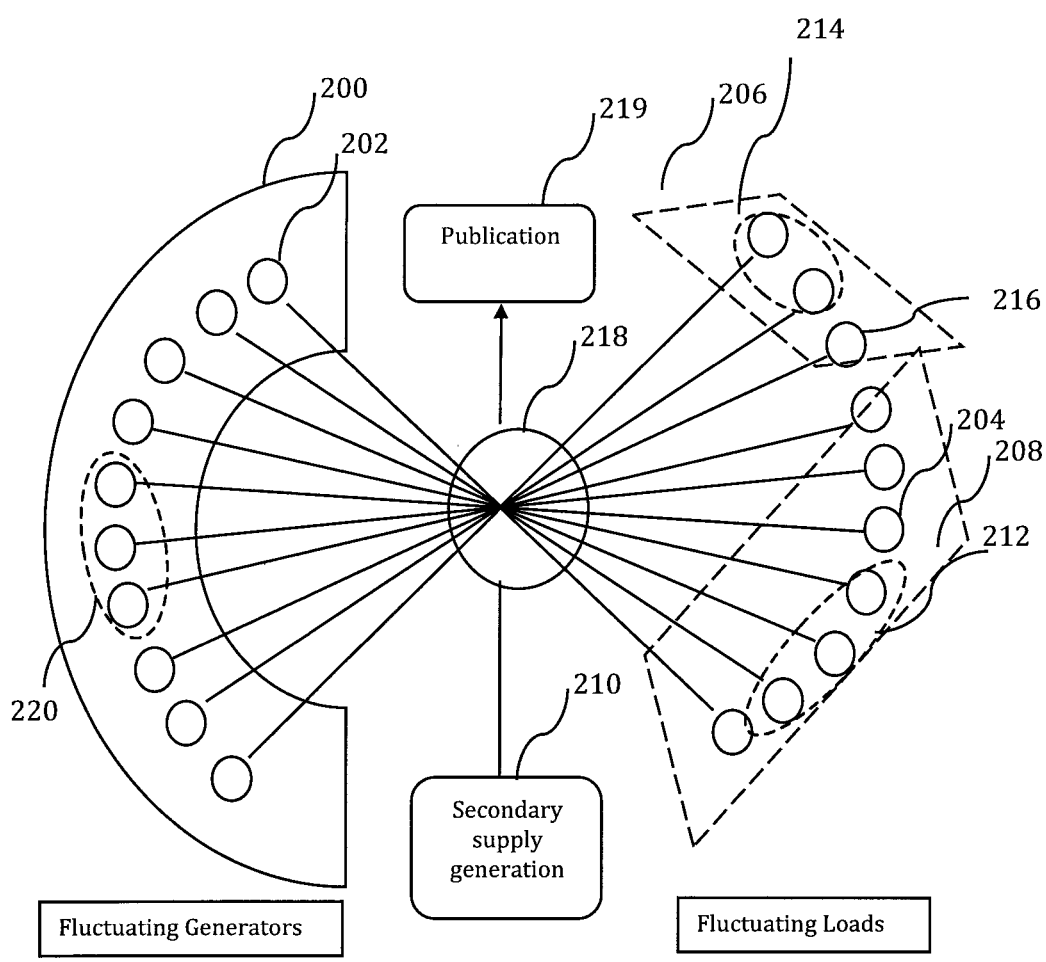
FIG. 2 shows a schematic drawing illustrating a set of intermittent generators and a set of loads and supply management thereof, wherein said loads are classified by their supply constraints, according to an example embodiment.

In FIG. 2, a numeral 200 represents the aggregated solar generating facilities with their associated generating profiles over time based their historic generation data and/or their specifications for simulation which accounts for the aggregated output from the individual generating facilities, e.g. 202.

Numeral 204 is a consumer load which is classified to have priority access to the generating facilities 200, and numeral 208 is a set of consumer load profiles that are classified to have priority access to the solar generation facilities 200, or are classified to have priority to a subset of generating facilities, for example subset 220 of generating facilities 200.

Numeral 216 is a consumer load which is classified to have no priority access to the generating facilities 200, and numeral 206 is a set of consumer load profiles that are classified to have no priority access to the generation facilities, or are classified to have no priority to any subset of generating facilities, for example subset 220 of generating facilities 200. As described, numerals 206, 208, 216, or 204 may each be associated with historic data and/or specifications for characterising a probabilistic demand scenario of the electricity consumer.

Numeral 212 is a sub-classification of consumer load profiles 208 which have priority to the generating facilities 200 and at least a second specific constraint requirement representing the amount of exposure and delivery required for association from generating facilities 200 or a subset of generating facilities 220. For example, numeral 212 classification could be all those consumer loads which require a particular same level of penetration as measured by the ratio of supply from intermittent generating facilities 200 or 220 to the load consumption of the set of loads of classification 212. Amongst the priority consumers 208, different sets of one or more loads each can be classified with different levels, such as 100%, 80%, 60%, 40% or 20%, by way of example, not limitation. It is noted that priority consumers may have additional constraints such as specific times/time intervals at which the solar blend is to be provided, which can form the basis of additional sub-classification(s).

Numeral 214 is a sub-classification of consumer loads 208 which have no (or limited) priority to the generation facilities 200 in respect of the initial priority established, and at least a second specific constraint requirement representing the amount of exposure and delivery required for association from generating facilities 200 or a subset of generating facilities 220. A plurality of such priorities and constraints can be established, each given then a specific electrical power supply product in association with the access given to the production of distributed solar power through the match-making system and method implemented therein. For example, numeral 214 classification could be all those non-priority consumer loads which have an optional level of penetration as measured by the ratio of supply from intermittent generating facilities 200 or 220 to the load consumption of the set of loads of classification 212, such as up to 100%, up to 80%, up to 60%, up to 40% or up to 20%, by way of example, not limitation.

Generally, the loads comprise different sets of one or more loads each, the loads of each set having at least one load characteristic in common. A first set may comprise one or more loads having a predetermined percentage of their power demand to be supplied from the plurality of generators. A second set may comprise one or more loads having a predetermined amount of power from the plurality of generators to be supplied to them. A third set may comprise one or more loads having a predetermined percentage of energy from one or more specified ones of the generators to be supplied to them. A fourth set may comprise one or more loads having a flexible amount of energy from the plurality of generators to be supplied to them.

Numeral 210 is a secondary supply resource, which may be embodied by, for example, a wholesale or spot energy market, an energy futures market, or physical delivery of electrical power from a secondary generating facility, or could be embodied by energy drawn from an energy storage medium.

Numeral 218 is a processing unit according to an example embodiment, here in the form of a consolidation computation module which may be implemented in the command station 110 (FIG. 1) and computes forward looking supply models and associated probabilities of meeting constraints associated with consumer load classifications 206, 214, 208, or 212, and optionally backward-looking audits and reconciliation methods verifying the associated expectation values of meeting said constraints associated with consumer load classifications 206, 214, 208, or 212 based on simulation, and/or historical measurements/historic data and/or specifications of the generators and loads. A back-ward looking audit may involve, for example, shifting energy resources 200 or 220 from no-priority consumption loads 206, 216, or 214 to priority consumption loads 208, 212, or 204.

Numeral 219 represents a publication system for the information provided for publication which may be a presentation of delivery, historical measurements of the consumer load demands of 206, 216, 214, 208, 212, or 204; historical measurements of the generation facilities 200, 202, or 220; or may be ratios and verifications of various constraints as computed at the consolidation module 218. Example embodiments of such a publication system may take the form of an Application Programme Interface (API), a mechanism allowing presentation of information to social media, allowance for distribution of information to the internet, or for adaption into a consumer billing system.

The implementation of the supply scenario for distribution of generated solar energy in an example embodiment involves a system implementing both a statistical approach to project forward the total resources available for supply to a particular load. It is noted that an external resource such as from secondary supply generation 210 can also be implemented to project forward the total resources available for supply to a particular load in some embodiments. The consolidation module 218 can advantageously assist in allocating aggregated resources from a plurality of generating facilities to the associated supply loads of consumers, and establish the associated probability of meeting the characteristics of the supply loads that are provided to the consumers.

Optionally, a measurement system (not shown) can compare the actual generation on a real time basis and compute the actual supply of energy from the associated generating facilities so as to audit the blend of the energy provided to a particular load including from aggregated renewable energy facilities. Such a measurement and audit can be implemented at various time intervals in respect of the selected cycles implemented to bill consumers and reiterate the match-making algorithm. A remaining amount of energy can then be distributed and represented under audit on the consumer loads with limited priority to renewable energy in respect of a higher priority access implemented, or even with no priority wherein only excess electrical power left over through the entire priority cascade is blended into the lowest priority access electricity product.

For incidences in which a shortfall in energy has occurred, and reconciliation is required, a reconciliation process can be implemented to make up the shortfall to the priority accounts and potentially to modify the constraints on the supply terms to the loads on a forward-looking basis.

As described above, the set 200 of generating facilities e.g. 202, each have their various capacities, locations, electrical connection systems, and other information which could generally comprise all of the technical specifications of the installed energy system, and each having its own statistical output defined from its own specification as well as the variable external information that can be measured or that can be projected on a forward basis. The external data can be obtained as well and regression can be performed to establish all historical statistical variables of such external information on a look back basis. This includes the generation time profile divided into time slots or bins, the mean, mode, median, and other relevant statistical variables.

The consumer loads e.g. 204 are divided into differing classifications e.g. 206, 208, as described above. The various classifications 206, 208 can be associated with characteristics of sets of consumer requirements as specified in their supply agreements and may be of the form of guaranteed minimum renewable energy requirements of the consumers. The consumers equally may be associated into their own demand profiles showing the total consumption capacity of their loads to be supplied to. Supply arrangements for the consumers comprise energy from the intermittent generating facilities 200, and energy from a secondary source 210. For example, the secondary source 210 may comprise a wholesale energy pool or one or more combustion generators running on fuel.

According to example embodiments, as a matter of setting the analysis so that the relevant constraints on the supply terms to the loads e.g. 204 can be met, the first step in the process can be to form the probabilistic distribution representing generation capacity over time, the probabilistic distribution representing energy demand over time, and a division of the distribution of probabilistic demand into the relevant classifications which can each individually be validated against a specific set probability.

FIG. 2 shows the division of supply of the consumer loads e.g. 204 into two particular example classifications 206, 208, among other classifications e.g. 212, 214 represented internally to the initial division classification 206, 208. The upper level classification 206, 208 is used to form a division of the generating facilities 200 energy across the energy consumers' loads demands. The classification 208 in this embodiment is of those consumers' loads e.g. 204 who have priority to the energy derived from the generating facilities 200, against those consumers' loads e.g. 216 in the classification 106 that have no priority to the energy derived from the generating facilities 200. Priority here means, for example, that the consumers require a minimum amount of energy blended into their supply and as such, a portion of the energy from the generation facilities 200 is to be set aside to satisfy the particular constraint of that load demand. For any individual classification e.g. 212 within priority classification 208, the validation considers that the total demands of that set 212 must be performed considering all loads e.g. 204 under priority classification 208 against all generating facilities 200 considering all generating facilities that are online at the time of supply evaluation.

Assuming these generating facilities 200 are providing clean renewable electricity, for example as obtained from an intermittent photovoltaic generator, this priority classification 208 refers to the consumers who require a minimum amount of renewable electricity as may be specified in terms of different parameters (for example, as the renewable penetration ratio, the percentage minimum solar energy available, etc. as will be described in more detail below) and the no-priority classification 206 of consumers who do not require a minimum amount of renewable electricity. Classification parameters can include the renewable penetration ratio, the fraction of clean energy blended to a load, the amount of clean energy allocated into a particular time bin, a minimum numerical value in terms of a specific amount of clean energy in a given day, month, or year (e.g. "at least 10 MWh clean energy per year"), or can also be described as a correlation value associating the blend of energy obtained from the renewable energy resource against the fluctuations in demand in the secondary energy market which refers to the supply and demand characteristic in that energy pool.

Consumer loads e.g. 204 are thus divided to express the constraints associated with the supply to those loads. Under the supply allocation mechanism in an example embodiment, the total intermittent generation capacity that will be available at the period of supply is simulated, modeled, or otherwise derived statistically. The total generation profile is then allocated to the projected consumer loads' e.g. 204 demands in a manner in which all of the constraints of the priority loads 208 are first met.

In one example, the supply demand is analyzed such that the individual loads are evaluated based on their own total demand profiles, then divided into two broad classifications. The broad classification refers to consumer load demand of priority to the intermittent renewable resources and consumer load demand with no priority to the intermittent renewable resources. Sub classifications can then be identified within the classifications. The total probabilistic demand of each sub-classification can then be formed and the constraint or constraints associated to those loads can be formed. A statistical validation of each supply constraint is then computed accounting for all the subsets of constraints and the probabilistic aggregated generation facilities generation distribution profile.

Accordingly, the classification of the consumers' priority forms the principle division of consumer loads e.g. 204 for association with generating facilities 200 wherein an excess of any remaining energy supplied by the generating facilities 200 over the priority constraints of the prioritized consumer loads e.g. 204 is supplied to the loads with no priority e.g. 216. Those priority loads e.g. 204 form hard constraints against which the electricity supply should achieve at least a minimum level. As such, the determined forward looking probability density profile or other quantitative factor (such as for example, done via Monte-Carlo simulation) which represents the total energy available through the aggregated generating facilities according to example embodiments is allocated or matched to consumer loads e.g. 204 to meet the multiple constraints posed by the consumer load requirements and embodied in the probability density function of the consumer loads within the particular sets.

As mentioned above, any remaining generation capacity of the intermittent generating facilities 200 may be then allocated to the loads e.g. 216 which have no priority access to those generating facilities 200 or for use during the backward-looking audit during the reconciliation process described in more detail within. This can for example be done on a backward-looking basis where an audit of the actual loads' demands and actual supply from the intermittent resources is measured, and the constraints are verified. In addition, during the backward-looking audit, any shortfall in meeting the constraints can be made up for by providing any remaining resource to make up for those short falls.

The remaining energy can be blended into the loads e.g. 216 of no priority in a number of different ways. For example, the total aggregated demand of all of the loads e.g. 216 with no priority may be established, and the remaining energy allocated to those loads e.g. 216 to reflect a particular constraint as a renewable penetration level to those loads e.g. 216. This will comprise an amount of energy that is delivered to the loads e.g. 216 in comparison to the maximum energy demand periods of the loads. Alternatively, the energy can be divided by the total loads without regard to the amount of energy consumed by that load. In this manner, each load would obtain the same amount of renewable energy but would individually have a different percentage blend of renewable energy within the individual load consumption.

As will be appreciated by a person skilled in the art, stochastic optimization problems can be solved in several ways, including:

Scenario-based approaches that make no assumption on un-certainty distribution. However, they generally require a large number of scenarios (i.e., samples of historical data) for good performance, inevitably leading to high computational complexity [7, 13].

Probabilistic approaches where chance constraints incorporate uncertainty [4, 9]. To handle such constraints, we can either assume uncertain parameters come from specific distributions, or adopt a distributionally-robust approach [8, 10] that relies only on statistics of a distribution (e.g., mean and variance), hence is applicable to random variables drawn from a family of distributions.

Worst-case robust approaches which provide strategies that are guaranteed to meet constraints even in the worst-case scenario [2, 3]. However, this generally results in an overly-conservative allocation of resources.

The matching between solar producers and consumers has been recognised by the inventors as being capable of being formulated as chance constraints, probabilistic approaches are adopted in the embodiments described herein. Methods that assume specific distribution information (i.e., Gaussian and Gaussian Mixture Models (GMMs)) for use in example embodiments are first described generally and then a distributionally-robust preferred embodiment is described in detail.

Utilising Forecasting and External Data Collection for Load Modelling and Generation Modelling from Environmental Resource Modelling, According to Example Embodiments There are numerous mathematical models for solar radiation incident on the Earth's surface [1, 15]. Broadly speaking, these fall into two categories: physical and statistical. Physical models represent site attributes such as atmospheric turbidity, shadowing, and the level of diffuse radiation. In contrast, statistical models are entirely data driven. Accurate physical models use sophisticated forms and are highly parameterized, thus are not amenable for use in optimization. The embodiments described herein focus on statistical models.

Statistical models are used to either forecast solar radiation for the next time period, given past history, or to model the variability in solar irradiation for a specific hour of the day in a particular season [1]. To model solar radiation for a specific time period as an independent and identically distributed (i.i.d) random variable, Gaussian Mixture Models (GMMs) and their simplest variant, a single-Gaussian model, are used according to a preferred embodiment. In contrast to single models, in mixture models, each component of the mixture corresponds to a certain sky condition (such as cloudy, partly cloudy, or clear).

As with solar modeling, embodiments of the present invention statistically model load during a specific time period. A GMM (or a Gaussian) for load modeling is used in example embodiments. In a preferred embodiment, a distributionally-robust approach that considers a family of distributions is used.

Algorithmic Formulation for Mathematical Description of the Physical System, According to Example Embodiments Consider a time slotted system with each day indexed by d, and within each day there are several disjoint time slots indexed by k (e.g., 10:30 a.m.-11 a.m. and 12:00 p.m.-12:30 p.m.). Denote the set of the days considered as $D \triangleq \{1, \ldots, D\}$ and the set of the time slots within each day as $K \triangleq \{1, \ldots, K\}$.

A set of P solar producers numbering $|P|$ is given according to an example embodiment. Let $p_i(d, k)$ be the amount of solar energy that producer i generates during time slot k on day d. If a producer has more than one solar panel, $p_i(d, k)$ represents the aggregate amount of energy it generates.

Symmetrically, a set of C consumers numbering $|C|$ is given according to an example embodiment. Let $c_j(d, k)$ be the amount of energy used by consumer j during time slot k on day d. Note that due to the uncertainty of solar generation and load, information about $p_i(d, k)$ and $c_j(d, k)$ is not known in advance.

Figure 3:
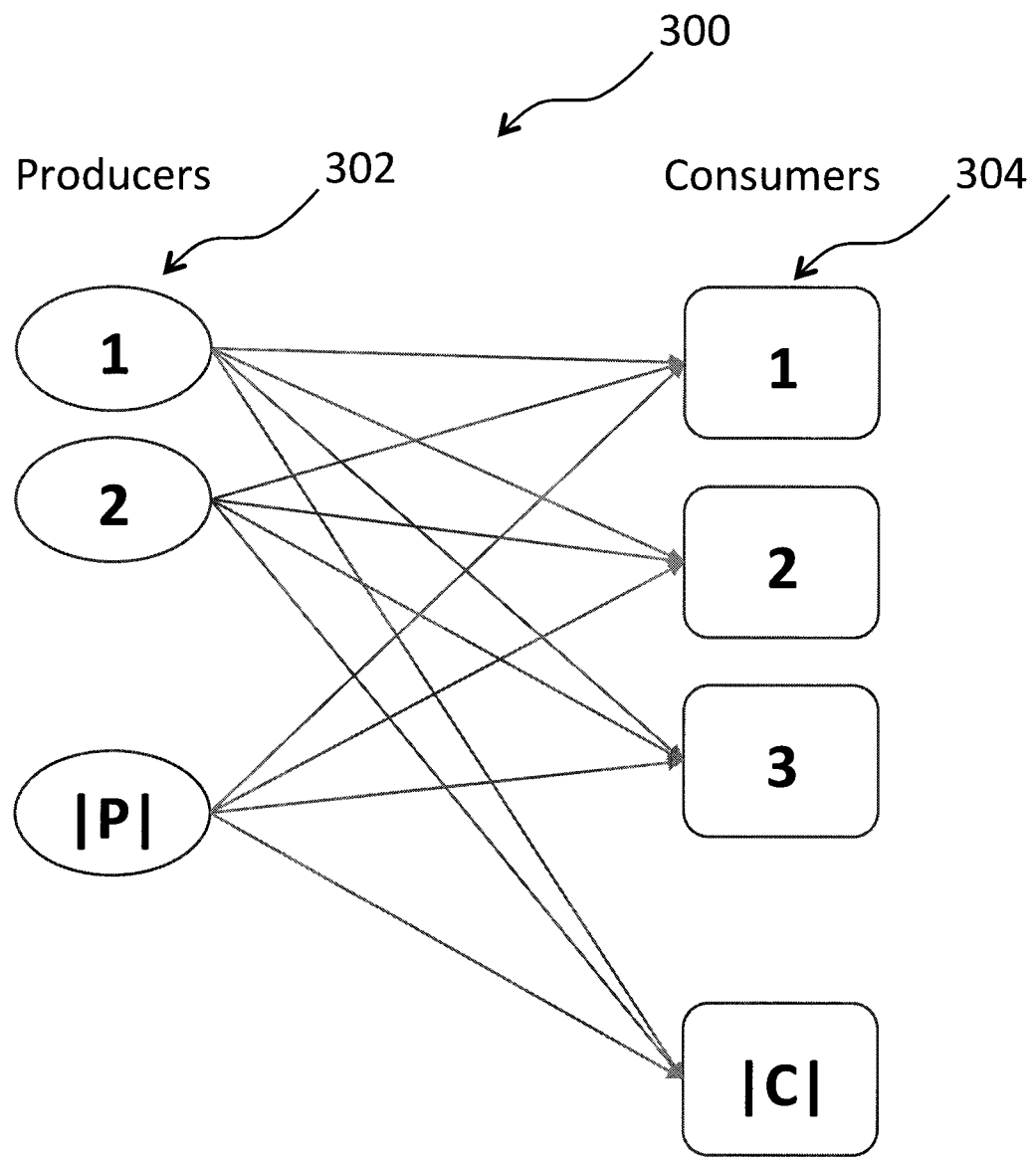
FIG. 3 shows a schematic drawing illustrating a system model for a matching algorithm according to an example embodiment.

In FIG. 3, a bipartite graph 300 according to an example embodiment is shown where the solar producers are in one set 302 and the consumers are in the other set 304. The direction of each edge indicates the direction of energy flow. A consumer can be served by multiple generators and a generator can serve multiple customers, i.e., a generator can split its generation without any constraint.

According to an example embodiment, the objective of the method and system implementation includes for priority access consumers, obtain the matching parameters for existing consumers and optionally design and implement admission control strategies for new generators and/or new consumers.

Production Resource and Consumption Load Matchmaking Algorithms Implemented on the Server(s), According to Example Embodiments A matching algorithm implemented according to example embodiments preferably takes into account the fact that values of the solar generation and loads are uncertain in that they are unavailable until they are realized. Thus, example embodiments use historical data when designing the matching parameters. In particular, the following information is assumed to be available according to the embodiments described herein:

for each solar producer, historical half-hourly solar generation of previous years/months; and for each existing/new customer, historical half-hourly energy consumption of previous years/months.

The matching algorithm implemented according to those example embodiments also assumes that there are enough solar resources in the system (i.e., the optimization problem is always feasible): However, different embodiments implemented to admit customers so that this assumption is met are also described.

The goal of the matching algorithm according to example embodiments is to construct a matching matrix $M \in \mathcal{R}^{|P| \times |C|}$ with its $(i, j)^{th}$ element $m_{i,j}$ denoting the percentage of generator I's generation assigned to consumer j for the whole cycle under consideration, which may be, but is not limited to, a billing cycle.

In the example embodiments the service requirement of consumer j is formulated as a chance constraint: $\Pr(c_j(d, k) \leq \Sigma_{i \in P} m_{i,j} p_i(d, k)) \geq \alpha$. That is, the load of consumer j during time slot k on day d should be met by solar generation with a probability, Pr, at least $\alpha$, e.g. $\alpha \in (0.5, 1)$, e.g., 0.9. It is noted here that in this example, a (single) constraint of 100% of consumed energy to be provided from the distributed generators is chosen for simplicity, i.e. for a priority consumer classification. However, it will be appreciated by a person skilled in the art that amongst the priority consumers 8, different sets of one or more loads each can be classified with different levels, such as 100%, 80%, 60%, 40% or 20%, by way of further example, not limitation, and the algorithm adapted to reflect those different classifications in the determination of the matrix M in different embodiments.

To determine the matching parameters, the following stochastic optimization problem is formulated in example embodiments, given the distributions of $p_i(d, k)$ and $c_j(d, k)$ and the target probability $\alpha$:

$$SP: \min_{M} \mathbb{E}\left[\sum_{d \in \mathcal{D}, k \in \mathcal{K}} \sum_{i \in P, j \in C} m_{i,j} p_i(d, k)\right] \text{ s.t. } m_{i,j} \geq 0, \quad \text{(Equation 1)}$$

$$\forall j \in \mathcal{P}, \forall j \in C,$$

$$\sum_{j} m_{i,j} \geq 0, \forall i \in \mathcal{P}, \quad \text{(Equation 2)}$$

$$Pr\left(c_j(d,k) \leq \sum_{i \in \mathcal{P}} m_{i,j} p_i(d,k)\right) \geq \alpha, \quad \text{(Equation 3)}$$

$$\forall d \in \mathcal{D}, \forall k \in \mathcal{K}, \forall j \in \mathcal{C}$$

where the objective according to an example embodiment is to minimize the expected solar production needed to satisfy the consumer demand, and the expectation is taken over the solar generation of all time slots.

This objective advantageously allows to subsequently allocate the most possible solar generation to non-priority customers in some embodiments. It is noted that constraint (Equation 3) is a stochastic constraint and cannot be solved using a standard solver. Therefore, example embodiments of the present invention advantageously translate this constraint into a form that can be solved using standard solvers running on the operating server, for example the command station 110 (FIG. 1). It is noted that the chance constraint (Equation 3) is more binding for higher values of $\alpha$.

Constraint (Equation 1) requires that all matching parameters should be greater than zero, according to the example embodiments. Constraint (Equation 2) ensures that the allocated solar generation of producer i cannot exceed its total resource, according to example embodiments.

Next, three approaches to solve SP according to example embodiments will be described, making different assumptions to model the uncertainty of future generation and load, thus resulting in different algorithms where constraint Equation 3 are translated into deterministic ones.

Stochastic Optimisation Using a Gaussian Approximation, According to Example Embodiments To transform the chance constraint to a deterministic form the distributions of the uncertain parameters are used. The Gaussian distribution is used in many applications and generally results in a simple analysis, as will be appreciated by a person skilled in the art. In one example embodiment, the Gaussian distribution is used to model the uncertainty of the solar and energy consumption, and an algorithm under this approximation is provided. In particular, the following assumptions are made in this example embodiment:

Assumptions 1, 2, 3 and 4 are:
1. the distribution of the solar generation and energy consumption is Gaussian;
2. the solar generation of all producers are linearly correlated;
3. the solar generation and energy consumption are independently distributed; and
4. the distribution of solar and energy consumption is independent and identically distributed (i.i.d.) over days, respectively.

Assumption (Assumption 2) is merely to simplify the analysis, since one can focus on the profile of one solar producer instead of |P| producers. It is expected that this assumption holds for geographically close solar producers, and it was further validated using real data, as will be described below. Assumptions (Assumption 3) and (Assumption 4) are technical assumptions that are preferred for either the problem formulation or later the derivation of empirical statistics. It is noted that, since the analysis relies on historical data according to example embodiment, it is implicitly assumed that the future can be characterized by historical data.

For simplicity of notation, it is assumed that there is only one time slot every day (e.g., 12:00 p.m.-12:30 p.m.) for which there is a commitment from the generators to the consumers and omit the index k below, noting that the approach can be readily generalized to multiple time slots by requiring that the constraint $\alpha$ be met for each of the selected time slots, or to be established over the selected period of power supply desired for use on the server 100, as will be appreciated by a person skilled in the art.

From assumption (Assumption 4), it suffices to only consider the chance constraint of each consumer on a typical day, thus the index d is also omitted for simplicity. Based on assumption 2, the solar generation of producer i is defined as $\beta_i p$. Solar generator 1 is treated as the reference with $\beta_1 = 1$, and its solar generation on day d is denoted by p(d) which is assumed to follow the Gaussian distribution with the mean $\bar{p}$ and variance $\sigma_p^2$. The value of other $\beta_i$ can be evaluated by comparing the solar generation of producer i and generator 1 based on historical data. The energy consumption of consumer j is also assumed in the example embodiments to follow the Gaussian distribution with mean $\bar{c}_j$ and variance $\sigma_j^2$.

With the Gaussian approximation and independence assumption, the chance constraint associated with consumer j, i.e., $Pr(c_j \leq \sum_{i \in \mathcal{P}} m_{i,j} \beta_i p) \geq \alpha$ can be equivalently written as $$\frac{-c_j + \bar{p}\left(\sum_{i \in \mathcal{P}} m_{i,j} \beta_i\right)}{\sqrt{\sigma_j^2 + \sigma_p^2 \left(\sum_{i \in \mathcal{P}} m_{i,j} \beta_i\right)^2}} \geq \Phi^{-1}(\alpha) \quad \text{(Equation 4)}$$

where $\Phi^{-1}(\alpha)$ is the $\alpha$-quantile of the standard Gaussian distribution. Since the threshold $\alpha > 0.5$, $\Phi^{-1}(\alpha) > 0$. Next it is shown that (Equation 4) is a second-order cone constraint in the example embodiments.

To facilitate the transformation to the second-order cone constraint, new optimization variables are introduced in the vector form. First the optimization variable $x_j \in \mathbb{R}^{|\mathcal{P}|+1}$ associated with consumers j is defined as $$x_j \triangleq [1, -m_{1,j}, -m_{2,j}, \ldots, -m_{|\mathcal{P}|,j}]^T \quad \text{(Equation 5)}$$

where T means transpose.

Then the optimization variable $y \in \mathbb{R}^{|\mathcal{C}|(|\mathcal{P}|+1)}$ is defined as $$y \triangleq [x_1^T, x_2^T, \ldots, x_{|\mathcal{C}|}^T]^T \quad \text{(Equation 6)}$$

It is noted that the optimization variable y is defined in such a way to make the optimization variable consistent in all the algorithms according to the described embodiments, which will be clear from the later description.

Based on the definition of $x_j$ and y, it follows $x_j = E_j y$, where $E_j \in \mathbb{R}^{(|\mathcal{P}|+1) \times |\mathcal{C}|(|\mathcal{P}|+1)}$ is a constant matrix with all elements equal to zero except the j-th ($|\mathcal{P}|+1$) columns which is the identity matrix.

The constant vector $c_i \in \mathbb{R}^{|\mathcal{P}|+1}$, $\forall i$ as $c_i \triangleq [0, \ldots, -1, \ldots, 0]^T$ is defined with all elements zero except the (i+1)-th element which is equal to $-1$. Then one can represent the matching parameter $m_{i,j}$ as $m_{i,j} = c_i^T x_j = c_i^T E_j y$. To transform the chance constraint, the constants $b_j \in \mathbb{R}^{|\mathcal{P}|+1}$, $\forall j$ is defined as $$b_j \triangleq [\bar{c}_j, \bar{p}\beta_1, \bar{p}\beta_2, \ldots, \bar{p}\beta_{|\mathcal{P}|}]^T \quad \text{(Equation 7)}$$

and $A_j \triangleq \mathbb{R}^{2 \times (|\mathcal{P}|+1)}$, $\forall j$, is defined as $$A_j \triangleq \begin{bmatrix} \sigma_j & 0 & 0 & \ldots & 0 \\ 0 & \sigma_p \beta_1 & \sigma_p \beta_2 & \ldots & \sigma_p \beta_{|\mathcal{P}|} \end{bmatrix} \quad \text{(Equation 8)}$$

Then constraint (Equation 4) is equivalent to $$\|A_j E_j y\| \leq \frac{-1}{\Phi^{-1}(\alpha)} b_j^T E_j y.$$

Finally, under the Gaussian approximation according to the described embodiments one can rewrite the stochastic optimization problem SP in the following form, given the mean and variance of the Gaussian distribution, the linear coefficients $\beta_i$, and the target probability $\alpha$:

$$GauSP: \min_{y} \sum_{i \in \mathcal{P}} \sum_{j \in C} |\mathcal{D}| p \beta_i c_i^T E_j y \text{ s.t. } c_i^T E_j y \geq 0, \quad \text{(Equation 9)}$$

$$\forall i \in \mathcal{P}, \forall j \in C$$

$$\sum_{j \in C} c_i^T E_j y \leq 1, \forall i \in \mathcal{P}, \quad \text{(Equation 10)}$$

$$\|A_j E_j y\| \leq \frac{-1}{\Phi^{-1}(\alpha)} b_j^T E_j y, \forall j \in C. \quad \text{(Equation 11)}$$

A discussion of how to derive the estimates of statistics of the Gaussian distribution in will be provided below. One can see that GauSP is a second-order cone program, which can be efficiently solved by existing optimization software packages such as CVX [12]. For the matching design according to example embodiments, GauSP is solved first. Once the optimization variable y is obtained, the matching parameters $m_{i,j}$ can be readily obtained according to example embodiments.

Utilising Stochastic Optimisation Gaussian Mixture Models on the Server as a Discrete System of Allocation for Power Generation of Distributed Generators and Supply to Loads, According to Example Embodiments In some embodiments, an algorithm obtained by approximating the distribution of solar and energy consumption as a Gaussian mixture model (GMM) is implemented.

Figure 4:
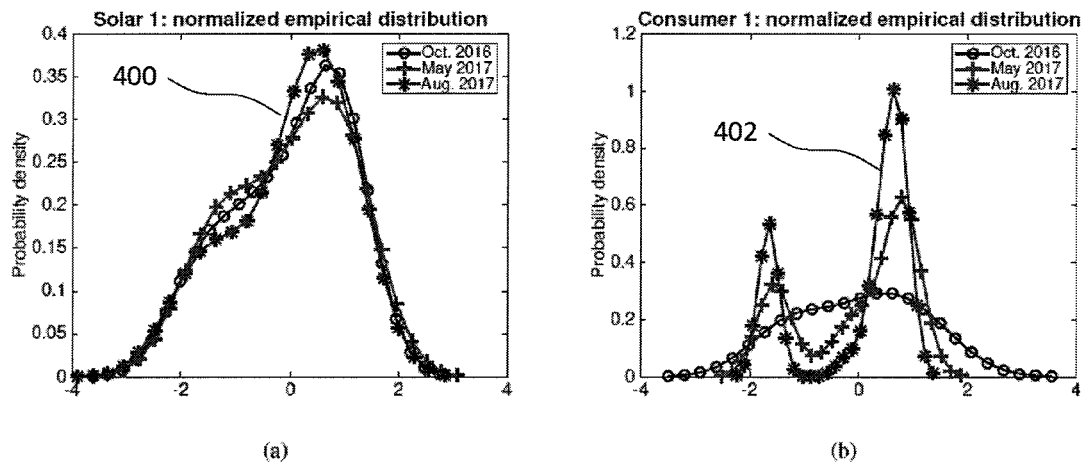
FIGS. 4(a) and (b) show graphs illustrating normalized empirical distributions of solar and energy consumption, respectively, according to an example embodiment.

For the derivation of the algorithm, the same assumptions (Assumption 1) to (Assumption 3) are made, except that in assumption (Assumption 1), the Gaussian distribution is replaced with a GMM. Indeed, based on measured generation data, in FIGS. 4(a) and (b), the normalized empirical distributions of solar generation and consumption, respectively, during the same half-hour of the day in three representative months are shown. It can be seen from FIGS. 2(a) and (b) that the empirical distributions e.g. 400, 402, have multiple peaks, consistent with a mixture model such as a GMM. Advantageously, the GMM models are used for solar generation profiling for stochastic optimisation on the servers, according to preferred embodiments. Other models may be best suited for the stochastic generation profiles of hydro or wind generation.

Using assumption (Assumption 1), the distribution of the reference solar generation is denoted as $$p \sim \sum_{r}^{R} \pi_r \mathcal{N}(\bar{p}_r, \sigma_r^2) \quad \text{(Equation 12)}$$

where R is the number of Gaussian components, $\pi_r$ is the probability associated with the r-th Gaussian component, $\bar{p}_r$ is the mean and $\sigma_r^2$ is the variance of the r-th Gaussian component.

Similarly, the distribution of the energy consumption of consumer j is denoted as $$c_j \sim \sum_{l}^{L_j} \pi_{j,l} \mathcal{N}(\bar{c}_{j,l}, \sigma_{j,l}^2) \quad \text{(Equation 13)}$$

where $\pi_{j,l}$ is the probability associated with the l-th Gaussian component, and $L_j$ is the number of Gaussian components.

The following proposition 1 is shown to hold:

PROPOSITION 1. Assume that the distribution of the solar generation and the energy consumption of each consumer follows a GMM, represented by (Equation 12) and (Equation 13), respectively. Also assume that the solar generation and energy consumption are independent. Then $c_j$ and p are jointly Gaussian mixture distributed. In particular, we have, $$\omega_j \triangleq \begin{bmatrix} c_j \\ p \end{bmatrix} \sim \sum_{l,r} \pi_{j,l} \pi_r \mathcal{N}\left( \begin{bmatrix} \bar{c}_{j,l} \\ \bar{p}_r \end{bmatrix}, \begin{bmatrix} \sigma_{j,l}^2 & 0 \\ 0 & \sigma_r^2 \end{bmatrix} \right). \quad \text{(Equation 14)}$$

For simplicity of notation, denote $\omega_j \sim \sum_{h=1}^{H_j} \pi_{j,h} \mathcal{N}(\mu_{j,h}, \Sigma_{j,h})$, where $H_j \triangleq RL_j$, $\pi_{j,h} \triangleq \pi_{j,l} \pi_r$, $$\mu_{j,h} \triangleq \begin{bmatrix} \bar{c}_{j,l} \\ \bar{p}_r \end{bmatrix}, \text{ and } \Sigma_{j,h} \triangleq \begin{bmatrix} \sigma_{j,l}^2 & 0 \\ 0 & \sigma_r^2 \end{bmatrix}.$$

PROOF. The mathematical proof can be derived from Prop. 4 in [11].

With the definition of $\omega_j$ in (Equation 14), one can rewrite the chance constraint associated with consumer j into a compact form as $\Pr(\omega_j^T z_j \leq 0) \geq \alpha$, where $z_j$ contains the optimization variables and is defined as $z_j \triangleq [-\sum_{i \in \mathcal{P}}^{-1} m_{i,j} \beta_i]$, introduction of $\omega_j$ will be used in the proof of Proposition 2 below.

Next, it is described how to handle the chance constraint under the GMM approximation according to example embodiments. Denote the original matching optimization problem with the constraints (Equation 9), (Equation 10) and the chance constraints $\Pr(\omega_j^T z_j \leq 0) \geq \alpha$, $\forall j$, as GmmSP-P1 and denote an optimal solution of GmmSP-P1 as y*. Consider a new optimization problem GmmSP-P2, which is the same as GmmSP-P1 except that the chance constraints are replaced with two deterministic constraints. Given the statistics of GMMs in (Equation 12) and (Equation 13), the linear coefficients $\beta_i$, and the target probability $\alpha$, one has the following formulation:

GmmSP-P2:

$$\min_{y, \epsilon_{j,h}} \left( |\mathcal{D}| \sum_{r} \pi_r \bar{p}_r \right) \sum_{i \in \mathcal{P}} \sum_{j \in C} \beta_i c_i^T E_j y \text{ s.t. } c_i^T E_j y \geq 0, \quad \text{(Equation 15)}$$

$$\forall i \in \mathcal{P}, \forall j \in C,$$

$$\sum_{j \in C} c_i^T E_j y \leq 1, \forall i \in \mathcal{P}, \quad \text{(Equation 16)}$$

-continued $$\sum_{h=1}^{H_j} \pi_{j,h} \epsilon_{j,h} \geq \alpha, \forall j, \quad \text{(Equation 17)}$$

$$\epsilon_{j,h} \leq \Phi\left(\frac{-\mu_{j,h}^T BE_j y}{\left\|\Sigma_{j,h}^{\frac{1}{2}} BE_j y\right\|}\right) \forall j, \forall h, \quad \text{(Equation 18)}$$

where $\epsilon_{j,h}$ are new optimisation variables, $\Phi(\cdot)$ is the cumulative distribution function (CDF) of the standard Gaussian distribution, and (Equation 17) and (Equation 18) are the new introduced constraints. It will be discussed below how to derive the estimates of statistics of GMMs. Denote an optimal solution of GmmSP-P2 as $(\tilde{y}, \tilde{\epsilon}_{j,h})$. Below we show the equivalence between these two optimisation problems.

PROPOSITION 2. Under assumptions (Assumption 1) to (Assumption 3), the stochastic optimization problems GmmSP-P1 and GmmSP-P2 are equivalent in the sense that, $$\left(y^*, \Phi\left(\frac{-\mu_{j,h}^T BE_j y^*}{\left\|\Sigma_{j,h}^{\frac{1}{2}} BE_j y^*\right\|}\right)\right)$$

is an optimal solution to GmmSP-P2 and $\tilde{y}$ is an optimal solution to GmmSP-P1, where $B \in \mathbb{R}^{2 \times (|\mathcal{P}|+1)}$ is a constraint matrix defined as $$B \triangleq \begin{bmatrix} 1 & 0 & \cdots & 0 \\ 0 & \beta_1 & \cdots & \beta_{|\mathcal{P}|} \end{bmatrix},$$

and $E_j$ is defined in Section 4.1.

PROOF.

Define a new random variable $\theta_j = \{1, 2, \ldots, H_j\}$. Suppose that the realization of $\theta_j$ is h. Then a sample of $\omega_j$ is drawn from the h-th Gaussian component. After introducing $\theta_j$, one has the following equivalence:

$$Pr(\omega_j^T z_j \leq 0) \geq \alpha \quad \text{(Equation 19)}$$

$$\Leftrightarrow \sum_{h=1}^{H_j} Pr(\omega_j^T z_j \leq 0, \theta_j = h) \geq \alpha \quad \text{(Equation 20)}$$

$$\Leftrightarrow \sum_{h=1}^{H_j} \pi_{j,h} Pr(\omega_j^T z_j \leq 0 \mid \theta_j = h) \geq \alpha \quad \text{(Equation 21)}$$

$$\Leftrightarrow \sum_{h=1}^{H_j} \pi_{j,h} \Phi\left(\frac{-z_j^T \mu_{j,h}}{\left\|\Sigma_{j,h}^{\frac{1}{2}} z_j\right\|}\right) \geq \alpha(19) \quad \text{(Equation 22)}$$

where the equivalence in (Equation 22) holds because given $\theta_j = h$, $\omega_j^T z_j$ is Gaussian distributed with the mean $\mu_{j,h}^T z_j$ and variance $z_j^T \Sigma_{j,h} z_j$. It is noted that $z_j$ can be represented as a linear function of the optimization variable y (defined in (Equation 6)) as $z_j = BE_j y$. Then the equivalence is readily apparent [5].

Based on Proposition 2, one has an equivalent deterministic optimization problem GmmSP-P2 for the matching design in example embodiments, which is desirable. However, GmmSP-P2 is a non-convex optimization problem due to constraint (Equation 20). Below a heuristic algorithm is proposed to solve GmmSP-P2 according to example embodiments. Advantageously, instead of solving a difficult optimization problem with joint variables y and $\epsilon_{j,h}$, a number of easier problems are solved where the variables $\epsilon_{j,h}$ are fixed. The final solution is then chosen as the one that results in the least objective. The detailed steps of the algorithm implemented according to example embodiments are listed as follows:

First define the maximum number of iterations as $I_{max}$.
1. Initialize $\epsilon_{j,h}$, $\forall j$, $\forall h$, satisfying constraints (Equation 13) (e.g. $\alpha$)
2. Given $\epsilon_{j,h}$, solve the following second-order cone optimisation problem with the optimal solution $\hat{y}$, and record $\hat{y}$:

GmmSP-P3:

$$\left(|\mathcal{D}|\sum_r \pi_r p_r\right) \sum_{i \in \mathcal{P}} \sum_{j \in C} \beta_i c_i^T E_j y \text{ s.t. } c_i^T E_j y \geq 0, \forall i \in \mathcal{P}, \forall j \in C,$$

$$\sum_{j \in C} c_i^T E_j y \leq 1, \forall i \in \mathcal{P},$$

$$\left\|\Sigma_{j,h}^{\frac{1}{2}} BE_j y\right\| \leq \frac{-\mu_{j,h}^T BE_j y}{\Phi^{-1}(\epsilon_{j,h})}, \forall j, \forall h.$$

3. Repeat steps (1.), (2.) above until the number of iterations achieves $I_{max}$
4. Choose the best solution $\hat{y}$ that results in the least objective in GmmSP-P3. Obtain the matching parameters based on the definition of y in (6).

Since constraints (Equation 17) always hold if one initializes $\epsilon_{j,h}$ as $\alpha$, one can start with $\alpha$. Other initialization values can be obtained by, for example, grid search in different embodiments. The maximum number of iterations $I_{max}$ is pre-selected in example embodiments. The larger the value of $I_{max}$, the lower the objective of GmmSP-P3, but the computational complexity accordingly increases.

A Distributionally-Robust Approach Based on a Family of Distributions to Algorithmic Matchmaking of Generation to Loads, According to Example Embodiments In the embodiments described above specific distributions are used to approximate the real distributions of solar and energy consumption in the future. Such approximations, however, may result in poor performance if the future data do not fit the assumed distribution. In some embodiments, a distributionally-robust approach by considering a family of distributions with some common statistical information (e.g., mean and variance) is adopted instead.

A chance constraint is generally hard to deal with except in some very specific cases. For example, when the distribution of the uncertain parameter is Gaussian, as described above, one can equivalently transform the chance constraint to a second-order cone constraint which is tractable, according to example embodiments. For other distributions, such as GMM described above, one can resort to heuristic algorithms, according to example embodiments. As mentioned before, by a distributionally-robust approach, instead of focusing on a specific distribution one considers a family of distributions. This would preferably lead to a conservative approximation of the chance constraint in such embodiments. With appropriate definition of this family of distributions, one can make the approximation according to such embodiments tractable.

For simplicity of notation, a slightly different random variable $\omega_j \in \mathbb{R}^{|\mathcal{P}|+1}$ associated with consumer j is defined:

$$\omega_j \triangleq [c_j, p, \beta_{2p}, \ldots, \beta_{|\mathcal{P}|p}]^T,$$

which denotes the consumption of consumer j and solar generation of all producers. Then for consumer j the chance constraint (Equation 3) can be rewritten in a compact form as $$\Pr(\omega_j^T x_j \leq 0) \geq \alpha, \quad \text{(Equation 23)}$$

where $x_j$ is defined in (Equation 5).

Define the mean and covariance matrix of $\omega_j$ as $\mu_j$ and $\Sigma_j$, respectively. Next the chance constraint is transformed into a distributionally-robust chance constraint as $$\inf_{\omega_j \sim \mathcal{F}(\mu_j, \Sigma_j)} \Pr(\omega_j^T x_j \leq 0) \geq \alpha, \quad \text{(Equation 24)}$$

where $\mathcal{F}(\mu_j, \Sigma_j)$ denotes the distribution family that contains all distributions with mean $\mu_j$ and covariance matrix $\Sigma_j$. It is readily appreciated by a person skilled in the art that if (Equation 16) holds then (Equation 15) holds. In the following theorem it is shown that (Equation 22) is equivalent to a second-order cone constraint.

THEOREM 1. For any given $\alpha \in (0.5, 1)$, the distributionally-robust chance constraint $\inf_{\omega_j \sim \mathcal{F}(\mu_j, \Sigma_j)} \Pr(\omega_j^T x_j \leq 0) \geq \alpha$ is equivalent to the second-order cone constraint $$\left\| \Sigma_j^{\frac{1}{2}} x_j \right\| \leq -\frac{1}{\sqrt{\alpha/(1-\alpha)}} \mu_j^T x_j,$$

where $\|\cdot\|$ denotes $L_2$ norm.

PROOF. The mathematical proof follows that of Theorem 3.1 in [7].

With Theorem 1, one can formulate a second-order cone program according to example embodiments, which is a conservative approximation of SP. Given the mean and covariance matrix of $\omega_j$, the linear coefficients $\beta_i$, and the target probability $\alpha$, one has the following formulation:

DRSP:

$$\min_y \sum_{i \in \mathcal{P}} \sum_{j \in C} |\mathcal{D}| \beta_i p c_i^T E_j y \text{ s.t. } c_i^T E_j y \geq 0, \quad \text{(Equation 25)}$$

$$\forall i \in \mathcal{P}, \forall j \in C,$$

$$\sum_{j \in C} c_i^T E_j y \leq 1, \forall i \in \mathcal{P},$$

$$\left\| \Sigma_{j,h}^{\frac{1}{2}} B E_j y \right\| \leq -\frac{1}{\sqrt{\alpha/(1-\alpha)}} \mu_j^T E_j y, \forall j \in C.$$

The estimation of statistics of $\omega_j$ will be described below. Comparing constraint (Equation 25) with constraint (Equation 11) in GauSP, one can see that the coefficients $b_j$ and $A_j$ in (Equation 11) play similar roles as $\mu_j$ and $\Sigma_j^{1/2}$ in (Equation 25), respectively. Since $\sqrt{\alpha/(1-\alpha)}$ is greater than $\Phi^{-1}(\alpha)$ for a particular $\alpha$, the upper bound in (Equation 23) is tighter than that in (Equation 12). In other words, (Equation 25) is more conservative than (Equation 11), which can be readily understand since DRSP is subject to a family of distributions which includes the Gaussian distribution.

Statistical Derivation for Matching Parameters Between Stochastic Distributed Generators and Stochastic Loads, According to Example Embodiments Recall that matching parameters are recomputed at the beginning of each billing cycle in the embodiments described herein. To do so, the proposed implemented algorithms use statistics derived from past history as input. For example, availability of the mean and variance of the Gaussian distribution is assumed in some embodiments, as described above, the statistics of GMM is assumed in some embodiments, and the mean and covariance matrix of $\omega_j$ is assumed in some embodiments With sufficient historical data, the empirical estimates of these statistics can be derived with a reasonably high accuracy; the greater the availability of historical data, the more accurate the statistical information, and hence the greater the accuracy of the matching parameters.

It the following, it will be described how to extract the desired statistics according to example embodiments. Assume that the data of solar and energy consumption are i.i.d. and denote $\{\omega_{(i)}\}_{i=1}^N$ as a set of N independent samples. Then the empirical mean of the random variable $\omega$ based on these N samples is $$\hat{\mu}_{(N)} = \frac{1}{N} \sum_{i=1}^N \omega_{(i)}$$

and the empirical covariance matrix of $\omega$ is $$\hat{\Sigma}_{(N)} = \frac{1}{N} \sum_{i=1}^N (\omega_{(i)} - \hat{\mu}_{(N)})(\omega_{(i)} - \hat{\mu}_{(N)})^T$$

It has been mathematically shown that, when the number of the samples N is large enough the distributionally-robust chance constraint (Equation 24) will hold with a high probability (Theorem 4.1 in [7]). In addition, using historical data, one can estimate the statistics of a GMM using an approach such as the Expectation-Maximization (EM) algorithm. The EM algorithm can be referenced to MatLab function fitgmdist( ).

Implementation of Admission Control Algorithms on the Server(s), According to Example Embodiments In the above description, has been assumed that there are enough solar resources to accommodate all consumers. In practice, the VPP may only be able to support a subset of all consumers who want to enter the system because of insufficient solar generation. A greedy sequential allocation strategy can be implemented in example embodiments for the admission of consumers.

In some embodiment, a start is made with a conservative estimate of j' consumers based on the operation of previous months. Specifically, one can begin with the consumer set {1, 2, . . . , j'} and design the matching parameters by implementing an algorithm according to example embodiments, e.g., DRSP. If the problem is found feasible, the next consumer is added and the algorithm is run again. The process continues until the problem becomes infeasible (i.e., the implemented optimization software cannot generate a solution.)

The admission of consumers is now considered. For each consumer requesting to join the program, it may be assumed that the consumer requires its monthly energy consumption be completely satisfied by unallocated solar generation from the prior billing cycle. Denote the set of consumers that request to join the program as $\mathcal{A}$ each indexed by q. Denote the prior billing cycle's energy consumption of consumer q by $a_q$. It is assumed that these consumers are ordered in descending order of priority, for example first-come-first served. With historical data, we know the value of $\alpha_q$, $\forall q \in \mathcal{A}$.

At the end of each billing cycle, using the matching parameters for existing j consumers, the VPP can derive the total amount of solar energy that has already been contracted for. Then the amount of the un-assigned solar generation for the whole month is U given by:

$$U = \sum_{i \in \mathcal{P}, d \in \mathcal{D}, k \in \mathcal{K}} p_i(d, k) - \sum_{i \in \mathcal{P}, d \in \mathcal{D}} p_i(d, k') \sum_{j \in C} m^*_{i,j}, \quad \text{(Equation 26)}$$

Where $m^*_{i,j}$ are the matching parameters for the existing j consumers, and k' is the particular time slot requested by existing consumers. In other words, (Equation 26) gives the maximum amount of solar generation that can be used for consumers requesting to join the program. Denote the set of the admitted ones of the consumers requesting to join the program as $\{1, 2, \ldots, q^*\}$. Then the total amount of solar energy for admitted consumers cannot exceed the available resources, i.e., there should be inequality $\Sigma_{q=1}^{q^*} a_q \leq U$. The admission method according to an example embodiment is to add consumers from the set of consumers requesting to join the program sequentially until this inequality becomes infeasible.

It is readily apparent to a person skilled in the art that the application of admission selection models can be performed with a set of priorities as well as constraints giving a plurality of power supply options to power consumers. In the above formulation, for simplicity, only a first-come-first-served type priority system for the consumers requesting to join the program and with a fixed production amount (i.e. their respective energy consumption to be completely satisfied by un-allocated solar generation) are presented.

In the following, the performance of the implemented algorithms according to different example embodiments will be compared using real-world data for one year (September 2016 to August 2017) of anonymized half-hourly solar generation and load data from two geographically close solar panels and 15 consumers. It is noted that the weather in Singapore is all-year similar with no obvious seasonal characteristics. Fortuitously, this is aligned with the i.i.d. assumption on solar data, according to example embodiments.

Figure 5:
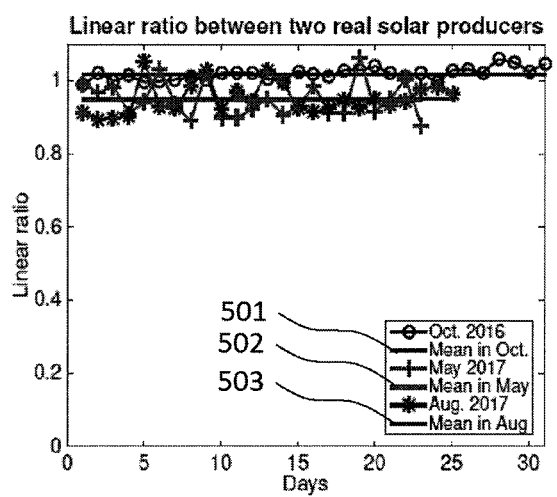
FIG. 5 shows a graph illustrating the linear ratio between real solar generation, for use in an example embodiment.

The normalized generation traces of several solar generators were compared for the whole year, and it was found that the ratio between the solar generators was close to 1, see FIG. 5 for the comparison of two representative generators as expressed by a linear ratio between the solar generators for three representative months, with plotted mean curves 501 to 503 for the respective months. This is in line with the assumption according to the described example embodiments that solar generation from different geographically-close generators is linearly correlated.

One of the solar generators was set as the reference, and, based on this reference solar generator, 8 synthetic solar producers were generated with the linear coefficients 4, 5, 3, 2, 4, 4, 3, and 1, respectively. In principle, these linear coefficients can be arbitrary, and should reflect the actual situation on the ground. For the comparison described herein, a representative set of values was chosen that generally resulted in feasible matchings under the algorithms according to example embodiments described above, and a benchmark "oracle" algorithm according to another example embodiment, which will be described below. In the comparison, a matching is generated for generation and load considering only one-time slot each day, i.e., 12 pm-12:30 pm. The solar generation of the i-th (i≥3) producer during 12 pm-12:30 pm on the d-th day is thus denoted by $p_i(d) = \beta_i p_1(d)$. However, it will be appreciated that embodiments of the present invention can be readily adapted to consideration of any desired period covering any desired time-slots in each desired period.

For simplification of the comparison, the focus was on priority consumers with a single (same) percentage, namely 100%, of their consumption to be met from the distributed solar generators. The underlying question for the comparison presented may be formulated as: given a target $\alpha$ and historical data, is there a preferred embodiment implementing one of the algorithms according to example embodiments to design the matching parameters? This question is considered in the comparison presented herein using a 12-fold cross validation based on real solar and load data. That is, the data is divided into months and 12 matchings are run. For each matching, one month is set as the test month and the rest are set as the training months. The purpose of training is to obtain the matching matrix M that corresponds to the training data. In the testing phase, the derived matching matrix is used in the test month. The actual test $\alpha$ is calculated for each consumer, which may be different from the target $\alpha$ in the training phase. In the training phase, different values of the target $\alpha$ are tried, from the set [0.75 0.8 0.85 0.9 0.95 0.99]. A high value of $\alpha$ indicates a more restricted chance constraint, in other words, the energy consumption would be satisfied with a high probability. The target $\alpha$ is the same for all consumers according to the comparison presented herein.

Three approaches to solve the matching problem according to example embodiments were described above, where the chance constraints in (Equation 3) are replaced by deterministic constraints, with stochastic parameters modelled either as Gaussian random variables, Gaussian Mixture Model random variables, or based on a family of distributions. It is noted that under the GMM assumption, two additional cases were considered according to example embodiments: 1) both solar generation and energy consumption are fit by GMM with two Gaussian components; GmmSP2; and 2) both solar generation and energy consumption are fit by the 'best fit' GMM; GmmSPb.

With GmmSPb, the number of Gaussian components can be up to a pre-determined threshold (e.g., 5), hence leading to a better fitted model of the training data. These two algorithms are solved in the same way, and the only difference is their distributional models, as will be appreciated by a person skilled in the art.

To compare the algorithms, it is observed that a preferred algorithm should be feasible both in the training and testing phases and minimize the objective function. Before comparing the algorithms, the "oracle" benchmark algorithm is described next.

The "oracle" matching algorithm knows the future perfectly and can therefore allocate the least generation resources to guarantee the desired load. In other words, the target α under the benchmark "oracle" algorithm for all consumers is 1. More precisely, given $p_i(d, k)$ and $c_j(d, k)$, $\forall i$, $\forall j$, $\forall d \in D$, $\forall k \in K$, the "oracle" algorithm solves the following problem:

Oracle:

$$\min_{M} \sum_{d \in \mathcal{D}, k \in \mathcal{K}} \sum_{i \in \mathcal{P}, j \in C} m_{i,j} p_i(d, k) \text{ s.t. } m_{i,j} \geq 0, \quad \text{(Equation 27)}$$

$$\forall i \in \mathcal{P}, \forall j \in C,$$

$$\sum_j m_{i,j} \leq 1, \forall i \in \mathcal{P},$$

$$c_j(d, k) \leq \sum_{i \in \mathcal{P}} m_{i,j} p_i(d, k), \forall d \in \mathcal{D}, \forall k \in \mathcal{K}.$$

Since there are no uncertain parameters, the "oracle" algorithm is a deterministic (linear) optimization problem, which is easy to solve. The "oracle" algorithm provides a lower bound of the objective when the energy consumption is completely met by solar.

As observed earlier, there are two aspects of feasibility. First, in the training phase, the optimization problem in the implemented algorithms according to example embodiments may become infeasible (and thus cannot generate the matching parameters) if the target α is greater than some threshold. Second, when used in the test month, the matching parameters derived in the training phase may result in a test α that is lower than the target α. Both types of feasibility were evaluated, according to example embodiments.

TABLE 1

Number of feasible trainings

|  | 0.75 | 0.8 | 0.85 | 0.9 | 0.95 | 0.99 |
|---|---|---|---|---|---|---|
| GauSP | 12 | 12 | 12 | 12 | 12 | 12 |
| GmmSP2 | 12 | 12 | 12 | 12 | 12 | 7 |
| GmmSPb | 12 | 12 | 12 | 12 | 12 | 12 |
| DRSP | 12 | 12 | 12 | 0 | 0 | 0 |

In Table 1, the feasibility in the training phase is shown. For each implemented algorithm according to example embodiments, the number of times, out of the total 12 experiments, is listed for all values of the target α that the example embodiments were able to generate the matching parameters. It can be seen from Table 1 that first, GauSP and GmmSPb are feasible in the training phase for all values of the target α; second, GmmSP2 is generally feasible except when the target α is close to 1; and DRSP is only feasible for relatively small values of α. To see if this behaviour of DRSP according to such embodiments was due to inadequate supply of solar energy, the linear coefficients of the 8 synthetic solar producers were increased to 1000, 2000, 3000, 3000, 4000, 4000, 5000, and 5000. Even with these very high values for solar generation, DRSP was still found to be infeasible for α≥0.9. Hence, the infeasibility of DRSP in the high range of α was attributed to its high level of conservatism, based on it being insensitive to the distribution of the underlying random variables.

Figure 6:
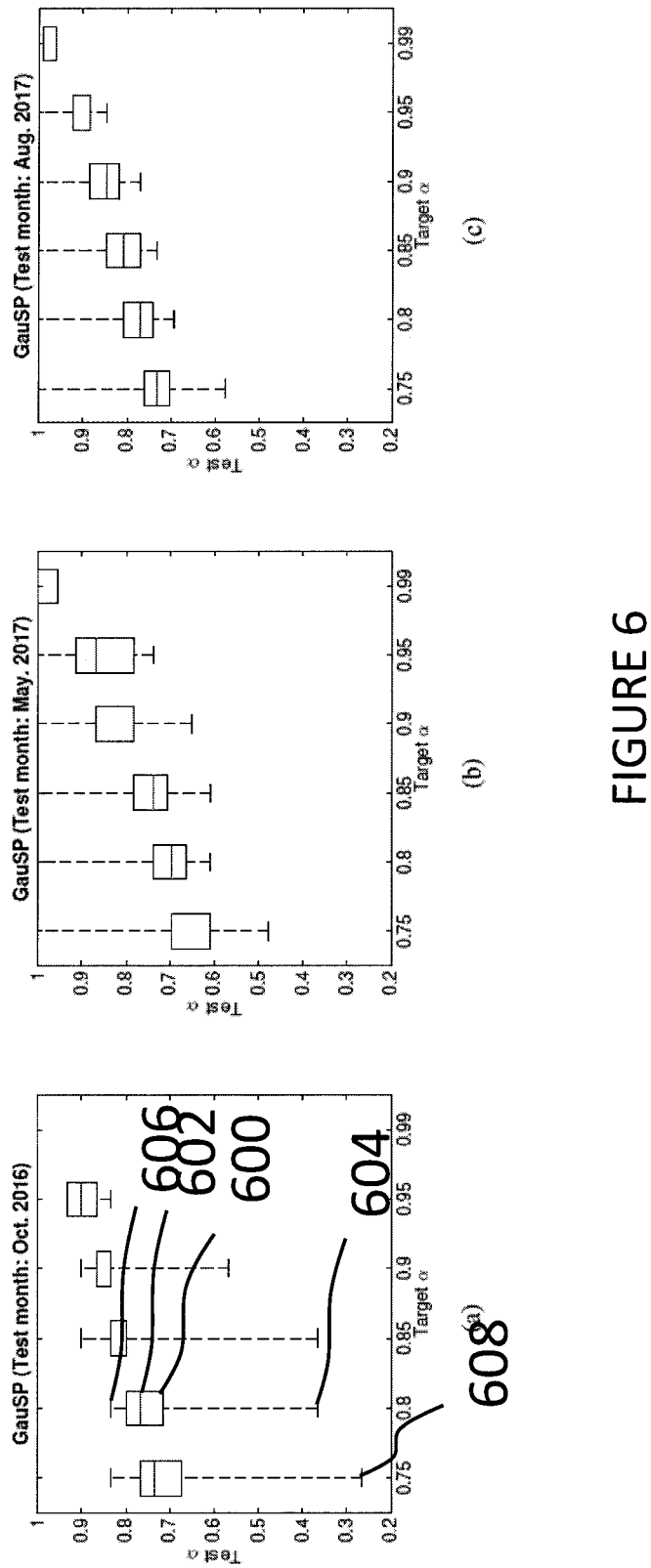
FIGS. 6(a) to (c) show graphs illustrating feasibility checks for a method and system according to an example embodiment.
Figure 7:
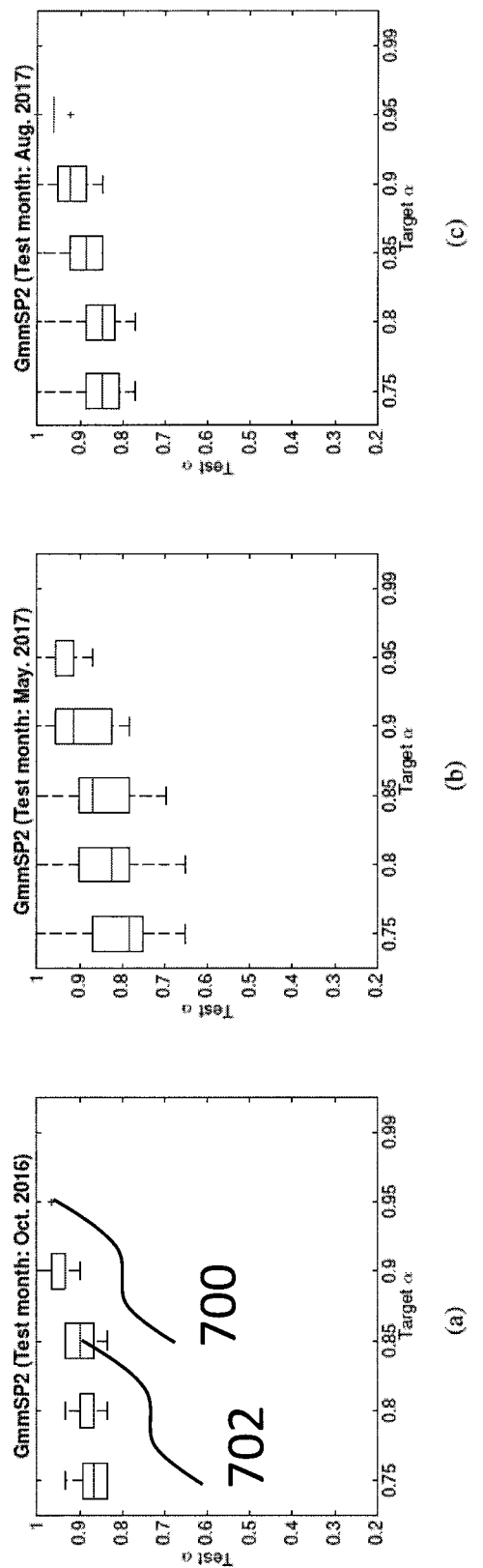
FIGS. 7(a) to (c) show graphs illustrating feasibility checks for a method and system according to an example embodiment.

Next feasibility in the test phase was considered. In FIGS. 6-7, box plots are used to show results on the target α for the different embodiments as a function of the test α for all 15 consumers for three different months (a)-(c), respectively. For each consumer, the test α is calculated as the number of days in the test month where the energy consumption is fully met by solar for the time slot under consideration, over the total number of days in the month. In each box e.g. 600, the central line e.g. 602 denotes the median, the lower and upper edge of the box e.g. 600 are the 25th and 75th percentiles, respectively, and the whiskers e.g. 604, 606 extend to the minimum and maximum data points not considered outliers. Outliers, if any, are shown as plus signs e.g. 700. To check feasibility, it was determined whether the minimum test α among all 15 consumers exceeds the target α.

From FIG. 6, it can be seen that GauSP cannot guarantee feasibility for all consumers because, for each target α, there is at least one consumer whose constraint is unmet, i.e. whose test α is lower than the target α (except when α equal to 0.99 in October 2016). For example, in the test month October 16, when the target α is set as 0.75 there is one consumer 608 whose test α is as low as 0.27. In addition, the median test α is, in general, below the target α, see e.g. mean 602 of test α of about 0.77 for a target α of 0.8.

Figure 8:
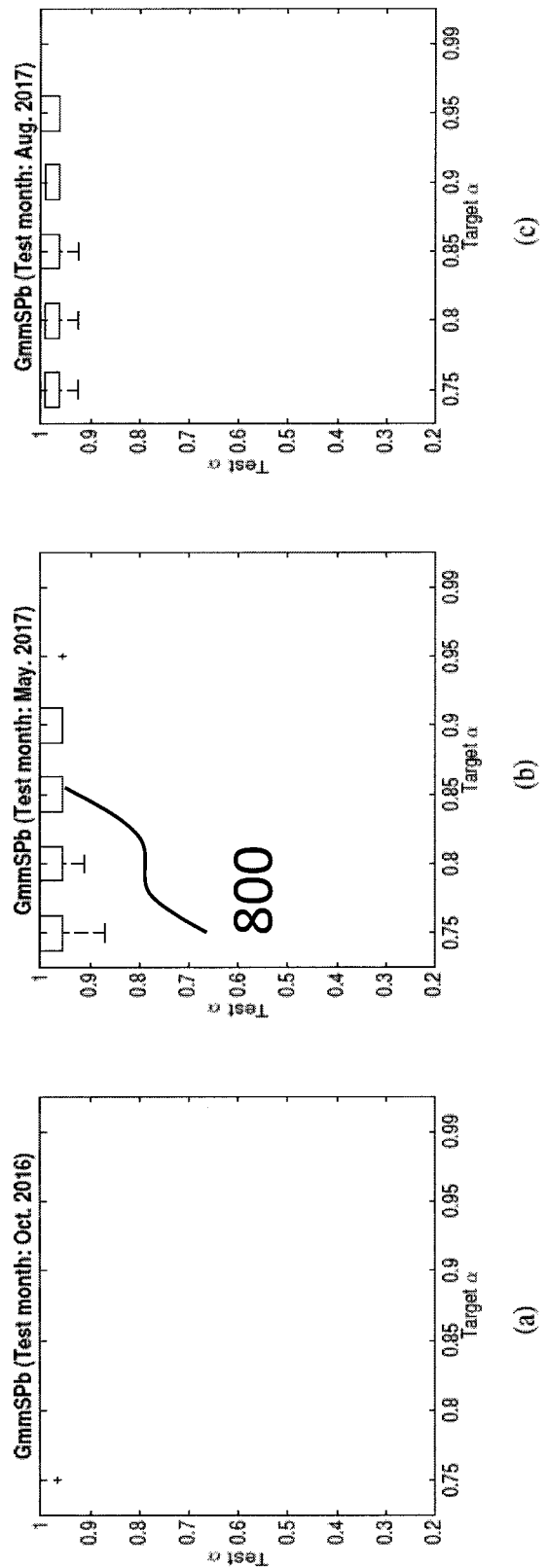
FIGS. 8(a) to (c) show graphs illustrating feasibility checks for a method and system according to an example embodiment.

Similar to GauSP, GmmSP2 does not provide feasibility for all consumers. Nevertheless, its feasibility performance is better than that of GauSP, since from FIG. 7 the median test α e.g. 702 is generally greater than that of the target α. With reference to FIG. 8, GmmSPb was found to ensure feasibility in all cases. However, GmmSP2 is quite conservative especially in the lower range of α, in that the test α e.g. 800 is much higher than the target α in general. For example, in as many as seven test months all test α are greater than 0.95 regardless of the values of the target α.

Figure 9:
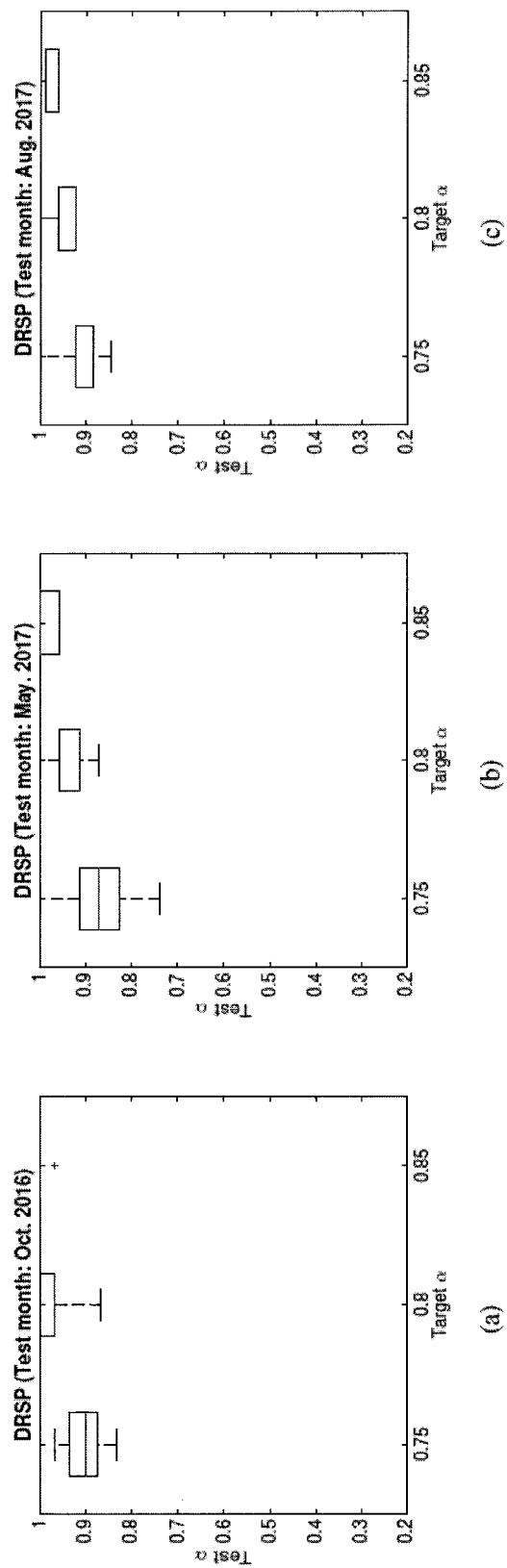
FIGS. 9(a) to (c) show graphs illustrating feasibility checks for a method and system according to an example embodiment.

Finally, from FIG. 9, it can be seen that DRSP, when feasible in the training phase, is also feasible in the test phase. However, it is noted that DRSP did find a feasible solution in the training phase for typical values of α≥0.9.

In summary, based on feasibility in both the training phase and test phase according to the comparison presented herein for the example embodiments, a preferred embodiment implements GmmSPb.

Figure 10:
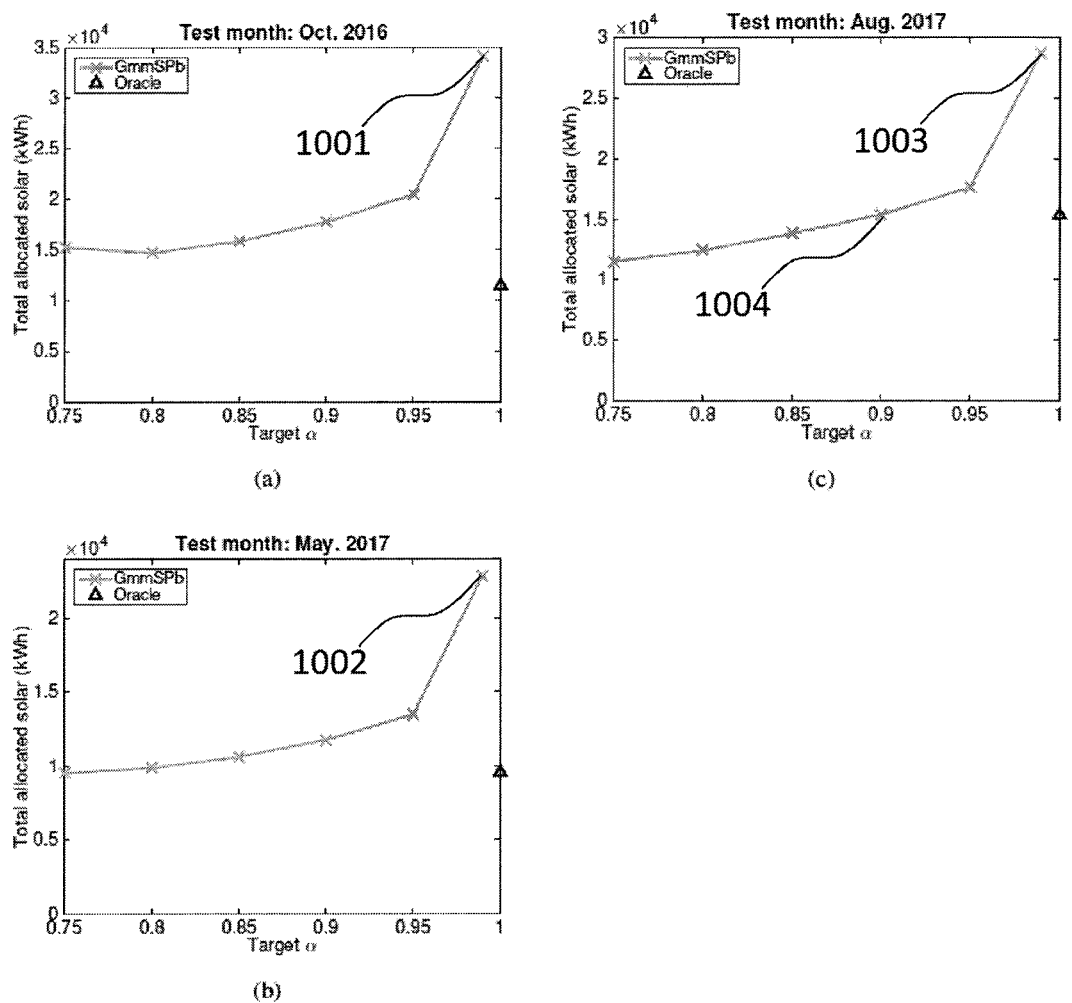
FIGS. 10(a) to (c) show graphs illustrating a comparison of objective for a method and system according to an example embodiment.

In the following, the performance of a preferred embodiment implementing GmmSPb is compared with that of the benchmark "oracle" algorithm. From FIG. 10 it can be seen that with the target α equal to 0.99, the total amount of the allocated solar generation to the consumers using the preferred embodiment implementing GmmSPb is 3 (October 2016), 2.4 (May 2017), and 1.9 (August 2017) times, respectively, that using the benchmark "oracle" algorithm, see data points 1001-1003. On the other hand, with the same amount of the allocated solar as that using the benchmark "oracle" algorithm, it is possible for GmmSPb to achieve the target α equal to 0.9 (August 2017, data point 1004), but the target α with the same amount of the allocated solar can also be lower than 0.75 (October 2016).

Notably, the electrical production from the solar generators may be determined and measured through secondary means, for example, a forecasting tool may be utilised wherein irradiation measurements are made using a meteorological weather system implementing a small set of irradiation measurement devices, and broadcasting or utilising information from these secondary measurements to estimate production values of electrical power associated with solar generators in proximity to those secondary measurements.

In this systems arrangement, the measurement of electrical power may be simplified by eliminating or removing some of the electrical measurement apparatus for replacement with the measured meteorological information obtained.

FIG. 11 illustrates the method step 1100 of an operation method for distributed generation from a plurality of generators, according to an example embodiment. At step 1100, a forward looking matching algorithm is applied to determine a matching matrix with elements $m_{i,j}$ denoting the fraction of generator i's predicted supply assigned to respective load j of a plurality of loads such that a probability of meeting each load's associated power demand characteristic in a next supply cycle satisfies a threshold criterion.

A chance constraint associated with load j may be implemented as a heuristic algorithm.

The plurality of generators may comprise a plurality of solar electricity generators, and a distribution of solar electricity generation from respective ones of the solar electricity generators may be implemented as a Gaussian mixture model. A number of Gaussian components in the Gaussian mixture model may be up to a predetermined threshold, such as two or more, and preferably five.

The plurality of generators may comprise a plurality of solar generators, and a distribution of solar generation from respective ones of the solar generators may be implemented as a Higher Order Marcov Chain.

A chance constraint associated with load j may be implemented as a second order cone constraint.

The plurality of generators may comprise a plurality of solar electricity generators, and a distribution of solar electricity generation from respective ones of the solar electricity generators is implemented as a Gaussian model.

The method may further comprise optimizing the determination of the matching matrix such that a predicted surplus of energy generated by the plurality of generators not assigned to a load is maximized.

The method may further comprise sequentially admitting one or more additional loads having respective associated power demand characteristics if a surplus of the distributed energy generation is determined in satisfying the threshold criterion. Sequentially admitting the one or more additional loads may comprise repeating application of the matching algorithm taking into account the respective additional loads and admitting a last added load unless a shortfall of the distributed energy generation is determined from application of the matching algorithm based on the last added load.

The method may further comprise adding one or more additional generators and repeating application of the matching algorithm.

The loads may comprise different sets of one or more loads each, the loads of each set having at least one load characteristic in common. The different sets of loads may have different associated priorities, and the method may comprises applying the forward looking matching algorithm taking into account the different priorities and/or sequentially admitting one or more additional loads taking into account the different priorities. A first set may comprise one or more loads having a predetermined percentage of their power demand to be supplied from the plurality of generators. A second set may comprise one or more loads having a predetermined amount of power from the plurality of generators to be supplied to them. A third set may comprise one or more loads having a predetermined percentage of energy from one or more specified ones of the generators to be supplied to them. A fourth set may comprise one or more loads having a flexible amount of energy from the plurality of generators to be supplied to them. The flexible amount may comprise a range up to a predetermined maximum amount.

FIG. 12 shows a flow chart 1200 illustrating an operation method for distributed generation from a plurality of generators, according to an example embodiment. At step 1202, a forward looking matching algorithm is applied such that a probability of meeting an associated power demand characteristic of each one of a plurality of loads satisfies a threshold criterion. At step 1204, one or more additional loads having respective associated power demand characteristics are sequentially added if a surplus of the distributed energy generation is determined while satisfying the threshold criterion.

Sequentially admitting the one or more additional loads may comprise repeating application of the matching algorithm taking into account the respective additional loads and admitting a last added load unless a shortfall of the distributed energy generation is determined from applying of the matching algorithm based on the last added load.

The method may further comprise performing the method according to the embodiment described above with reference to FIG. 11.

In the method according to any one of the embodiments described above with reference to FIGS. 11 and 12 the generators may comprise solar electricity generators and electrical production from the solar electricity generators may be determined and measured through secondary means such as irradiation measurement means for eliminating or removing of an electrical measurement apparatus for measuring electrical production from the solar electricity generators.

Figure 13:
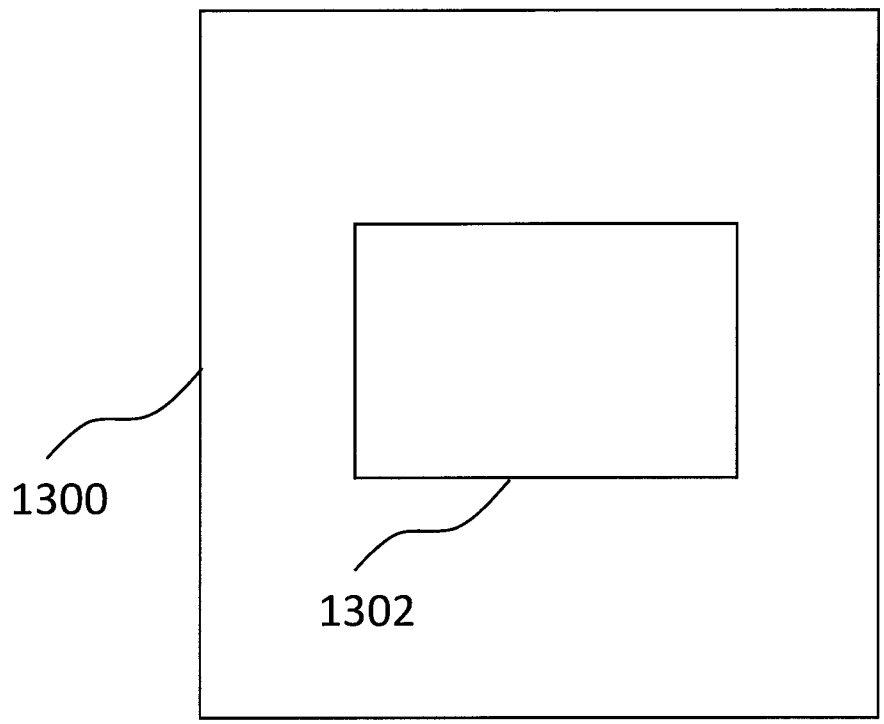
FIG. 13 is a schematic drawing illustrating an operation system for distributed generation from a plurality of generator, according to an example embodiment.

FIG. 13 is a schematic drawing illustrating an operation system 1300 for distributed generation from a plurality of generator, according to an example embodiment. The system 1300 comprises a processing unit 1302 configured for applying a forward looking matching algorithm to determine a matching matrix with elements $m_{i,j}$ denoting the fraction of generator i's predicted supply assigned to respective load j of a plurality of loads such that a probability of meeting each load's associated power demand characteristic in a next supply cycle satisfies a threshold criterion.

A chance constraint associated with load j may be implemented as a heuristic algorithm.

The plurality of generators may comprise a plurality of solar electricity generators, and a distribution of solar electricity generation from respective ones of the solar electricity generators is implemented as a Gaussian mixture model. A number of Gaussian components in the Gaussian mixture model may be up to a predetermined threshold, such as two or more, and preferably five.

A chance constraint associated with load j may be implemented as a second order cone constraint.

The plurality of generators may comprise a plurality of solar electricity generators, and a distribution of solar electricity generation from respective ones of the solar electricity generators is implemented as a Gaussian model.

The processing unit 1302 may be further configured for optimizing the determination of the matching matrix such that a predicted surplus of energy generated by the plurality of generators not assigned to a load is maximized.

The processing unit 1302 may be further configured for sequentially admitting one or more additional loads having respective associated power demand characteristics if a surplus of the distributed energy generation is determined in satisfying the threshold criterion. Sequentially admitting the one or more additional loads may comprise repeating application of the matching algorithm taking into account the respective additional loads and admitting a last added load unless a shortfall of the distributed energy generation is determined from application of the matching algorithm based on the last added load.

The processing unit 1302 may be further configured for adding one or more additional generators and repeating application of the matching algorithm.

The loads may comprise different sets of one or more loads each, the loads of each set having at least one load characteristic in common. The different sets of loads may have different associated priorities, and the processing unit 1302 may be configured for applying the forward looking matching algorithm taking into account the different priorities and/or for sequentially admitting one or more additional loads taking into account the different priorities. A first set may comprise one or more loads having a predetermined percentage of their power demand to be supplied from the plurality of generators. A second set may comprise one or more loads having a predetermined amount of power from the plurality of generators to be supplied to them. A third set may comprise one or more loads having a predetermined percentage of energy from one or more specified ones of the generators to be supplied to them. A fourth set may comprise one or more loads having a flexible amount of energy from the plurality of generators to be supplied to them. The flexible amount may comprise a range up to a predetermined maximum amount.

Figure 14:
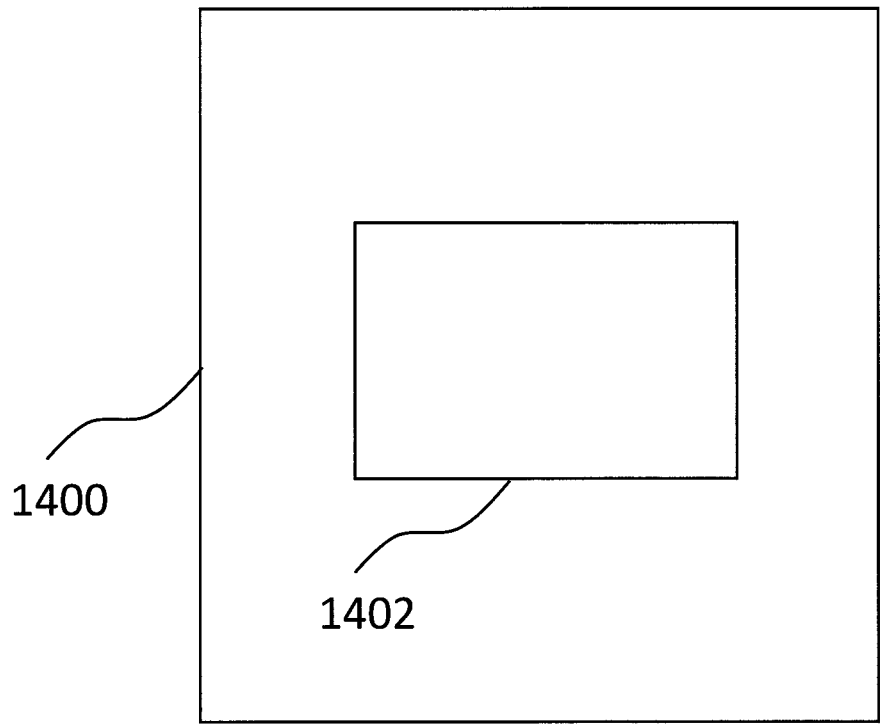
FIG. 14 is a schematic drawing illustrating an operation system for distributed generation from a plurality of generator, according to an example embodiment.

FIG. 14 is a schematic drawing illustrating an operation system 1400 for distributed generation from a plurality of generators, according to an example embodiment. The system 1400 comprises a processing unit 1402 configured for applying a forward looking matching algorithm such that a probability of meeting an associated power demand characteristic of each one of a plurality of loads satisfies a threshold criterion; and for sequentially admitting one or more additional loads having respective associated power demand characteristics if a surplus of the distributed energy generation is determined while satisfying the threshold criterion.

Sequentially admitting the one or more additional loads comprises repeating application of the matching algorithm taking into account the respective additional loads and admitting a last added load unless a shortfall of the distributed energy generation is determined from applying of the matching algorithm based on the last added load.

The system 1400 may further comprise the system 1300 according to any one of the embodiments described above with reference to FIG. 13. The processing unit 1302 may be same as processing unit 1402, or different therefrom.

In the system according to any one of the embodiments described above with reference to FIGS. 11 and 12 the generators may comprise solar electricity generators and electrical production from the solar electricity generators may be determined and measured through secondary means such as irradiation measurement means for eliminating or removing of an electrical measurement apparatus for measuring electrical production from the solar electricity generators.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] Viorel Badescu. 2014. Modeling solar radiation at the earth's surface. Springer.
[2] Aharon Ben-Tal, Laurent El Ghaoui, and Arkadi Nemirovski. 2009. Robust optimization. Princeton University Press.
[3] Aharon Ben-Tal and Arkadi Nemirovski. 1999. Robust solutions of uncertain linear programs. Operations research letters 25, 1 (1999), 1-13.
[4] John R Birge and Francois Louveaux. 2011. Introduction to stochastic programming.
[5] S. Boyd and L. Vandenberghe. 2004. Convex optimization. Cambridge university press. Springer Science & Business Media.
[6] Singapore Building and Construction Authority. 2018. Singapore BCA Green Mark Assessment Criteria. (2018). https://www.bca.gov.sg/GreenMark/green_mark_criteria.html
[7] G. Calafiore and L. El Ghaoui. 2006. On distributionally robust chance-constrained linear programs. Journal of Optimization Theory and Applications 130, 1 (July 2006), 1-22.
[8] Giuseppe C Calafiore and Marco C Campi. 2006. The scenario approach to robust control design. IEEE Trans. Automat. Control 51, 5 (2006), 742-753.
[9] Abraham Charnes and William W Cooper. 1959. Chance-constrained programming.
[10] E. Delage and Y. Ye. 2010. Distributionally robust optimization under moment uncertainty with application to data-driven problems. Operations research 58, 3 (2010), 595-612
[11] J. Flåm. 2013. The Linear Model Under Gaussian Mixture Inputs. Ph.D. Dissertation. Dept. of Elect. & Telecom. Norwegian Univ. of Science and Technology, Trondheim, Norway. Management science 6, 1 (1959), 73-79.
[12] M. Grant and S. Boyd. 2018. CVX: Matlab Software for Disciplined Convex Programming. (2018). http://cvxr.com/cvx/
[13] James Luedtke and Shabbir Ahmed. 2008. A sample approximation approach for optimization with probabilistic constraints. SIAM Journal on Optimization 19, 2 (2008), 674-699.
[14] NC Clean Energy Technology Center. 2018. Database of State Incentives for Renewables and Efficiency. http://www.dsireusa.org/. (2018).
[15] Joakim Widén, Nicole Carpman, Valeria Castellucci, David Lingfors, Jon Olauson, Flore Remouit, Mikael Bergkvist, Mårten Grabbe, and Rafael Waters. 2015. Variability assessment and forecasting of renewables: A review for solar, wind, wave and tidal resources. Renewable and Sustainable Energy Reviews 44 (2015), 356-375.

The invention claimed is:

1. An operation method for distributed generation from a plurality of generators, the method comprising the steps. of: determining, using a forward looking matching algorithm, a matching matrix with elements $m_{ij}$ denoting the fraction of generator i's predicted supply assigned to respective load j of a plurality of loads such that a probability of meeting each load's associated power demand characteristic in a next supply cycle satisfies a threshold criterion; and distributing power from the plurality of generators to the respective loads in accordance with the matching matrix, wherein:

the loads comprise different sets of one or more loads each, the loads of each set having at least one load characteristic in common, wherein the different sets of loads have different associated priorities; and wherein:

a first set comprises one or more loads having a predetermined percentage of their power demand to be supplied from the plurality of generators;

a second set comprises one or more loads having a predetermined amount of power from the plurality of generators to be supplied to them;

a third set comprises one or more loads having a predetermined percentage of energy from one or more specified ones of the generators to be supplied to them; and a fourth set comprises one or more loads having a flexible amount of energy from the plurality of generators to be supplied to them.

2. The method of claim 1, wherein the flexible amount comprises a range up to a predetermined maximum amount.

3. An operation system for distributed generation from a plurality of generators, the system comprising a processing unit configured for applying a forward looking matching algorithm, wherein the algorithm is configured to determine a matching matrix with elements $m_{ij}$ denoting a fraction of generator i's predicted supply assigned to respective load i of a plurality of loads such that a probability of meeting each load's associated power demand characteristic in a next supply cycle satisfies a threshold criterion, and wherein a probability of meeting an associated power demand characteristic of each one of a plurality of loads satisfies the threshold criterion, and the processing unit is further configured for sequentially admitting one or more additional loads having respective associated power demand characteristics when a surplus of the distributed energy generation is determined while satisfying the threshold criterion, wherein the processing unit is further configured for adding one or more additional generators and repeating application of the matching algorithm, and wherein:

the loads comprise different sets of one or more loads each, the loads of each set having at least one load characteristic in common;

a first set comprises one or more loads having a predetermined percentage of their power demand to be supplied from the plurality of generators;

a second set comprises one or more loads having a predetermined amount of power from the plurality of generators to be supplied to them;

a third set comprises one or more loads having a predetermined percentage of energy from one or more specified ones of the generators to be supplied to them; and a fourth set comprises one or more loads having a flexible amount of energy from the plurality of generators to be supplied to them.

4. The system of claim 3, where the different sets of loads have different associated priorities, and the processing unit is configured for applying the forward looking matching algorithm taking into account the different priorities and/or for sequentially admitting one or more additional loads taking into account the different priorities.

5. The system of claim 3, wherein sequentially admitting the one or more additional loads comprises repeating application of the matching algorithm taking into account the respective additional loads and admitting a last added load unless a shortfall of the distributed energy generation is determined from applying of the matching algorithm based on the last added load.

6. The system of claim 3, wherein the generators comprise solar electricity generators and electrical production from the solar electricity generators is determined and measured through irradiation measurement means for eliminating or removing of an electrical measurement apparatus for measuring electrical production from the solar electricity generators.

7. The system of claim 3, wherein the flexible amount comprises a range up to a predetermined maximum amount.

\* \* \* \* \*